United States Patent [19]

Schomburg

[11] 3,903,380

[45] Sept. 2, 1975

[54] METHOD AND APPARATUS FOR IDENTIFYING CONDUCTORS OR CONDUCTOR PAIRS IN A MULTICONDUCTOR CABLE USING SPEECH IDENTIFICATION

[75] Inventor: Richard A. Schomburg, Hillsboro, Oreg.

[73] Assignee: Communication Sciences Corporation, Hillsboro, Oreg.

[22] Filed: Aug. 10, 1973

[21] Appl. No.: 387,531

[52] U.S. Cl. .................... 179/175.3 A; 324/66

[51] Int. Cl. .................... H04b 3/46

[58] Field of Search .................... 179/175.3 A, 175.25; 324/66

[56] References Cited

UNITED STATES PATENTS

| | | | |
|---|---|---|---|
| 2,869,077 | 1/1959 | Houk | 324/66 |
| 3,288,944 | 11/1966 | Fleming | 179/175.3 A |
| 3,300,591 | 1/1967 | Gushue et al. | 179/100.3 B |
| 3,742,350 | 6/1973 | White | 324/66 |
| 3,751,667 | 8/1973 | Quittner | 250/211 J |

*Primary Examiner*—William C. Cooper
*Assistant Examiner*—Douglas W. Olms
*Attorney, Agent, or Firm*—Christensen, O'Connor, Garrison & Havelka

[57] ABSTRACT

A method of and an apparatus for identifying conductors or conductor pairs in a multiconductor cable using speech identification is disclosed. Audio frequency electrical waveforms related to spoken words are simultaneously and continuously generated. The spoken words represent the numerals 0 through 9 and the cardinal suffixes "hundred," "thousand," etc. The individual word waveforms are assembled into a plurality of simultaneously occurring and continuously available word sequence waveforms each representing one numerical value within the range of from 0 to an appropriate upper bound. The totality of such word sequence waveforms encompasses all integer numerical values within the defined range. In a simple form, usable primarily with short cables, each of the word sequence waveforms is applied to the like-numbered conductor or conductor pair at one end of a multiconductor cable, and a suitable audio transducer is randomly, sequentially connected to conductors or conductor pairs at any other point of the multiconductor cable. The audio output from the audio transducer uniquely identifies each conductor or conductor pair as it is sequentially connected to the conductors or conductor pairs. In a more comprehensive form, usable with both short and long cables (on the order of miles), application of each word sequence waveform to the like-numbered conductor or conductor pair is subject to the control of an enabling circuit dedicated to that conductor or conductor pair only. An enabling circuit, normally off, is turned on by the application, at any other point on the cable, of an enabling signal to the conductor or conductor pair selected at random for identification. A suitable audio transducer connected to the same conductor or conductor pair will then produce the identification information. Removal of the enabling signal returns the enabling circuit to its off state.

39 Claims, 16 Drawing Figures

METHOD AND APPARATUS FOR IDENTIFYING CONDUCTORS OR CONDUCTOR PAIRS IN A MULTICONDUCTOR CABLE USING SPEECH IDENTIFICATION

BACKGROUND OF THE INVENTION

This invention relates to methods and apparatus for automatically identifying conductors or conductor pairs in multi-conductor cables and more particularly relates to methods and apparatus for providing an automatic identification of any conductor or conductor pair selected at random in a multiconductor cable.

A wide variety of methods of and apparatus for identifying conductors or conductor pairs in a multiconductor cable have been proposed. Some of these methods and apparatus are in use in the telecommunication, instrumentation and computing industries. Others are in use to identify conductors or conductor pairs in multiconductor cables utilized by control systems to control the application of power to electrical and electromechanical machinery and the like. While some of these prior art methods and apparatus have been found to be somewhat satisfactory, they still have various disadvantages. For example, prior art methods and apparatus do not provide for the simultaneous identification of conductors or conductor pairs in an uncomplicated manner using relatively uncomplicated, and therefore reliable, equipment.

More specifically, many prior art methods and apparatus for identifying conductors or conductor pairs in a multiconductor cable have the disadvantage that they are time consuming. In many cases they are time consuming because signals are sequentially (rather than simultaneously) applied to one end of the conductors to be identified. This sequential application requires that a detecting device "wait" until a portion of (or in the worst case all of) the signal sequence has occurred before it detects the signal related to the particular conductor or conductor pair to which it is connected.

In addition, many of prior art methods and apparatus are unduly complicated. Because they are complicated, the apparatus for carrying out the methods is expensive to produce and is somewhat unreliable. Further, many prior art methods and apparatus are unusable when the conductors (or conductor pairs) to be identified are carrying communication signals and the like. Also, many prior art methods and apparatus require that complicated equipment be placed at the end of a multiconductor cable remote from a main central region. For example, many prior art systems require that a user, such as a telephone lineman, for example, connect complicated equipment to the end of the cable remote for the central station before conductor identification can be accomplished. Thus, users of such identification apparatus are required to transport expensive, specialized equipment in their vehicles. Such transportation is undesirable for a variety of obvious reasons. Still further, the need for two operators or users, required by many prior art systems, is undesirable. Moreover, many prior art systems are not usable to identify the conductors or conductors pairs contained in relatively long multiconductor transmission lines, such as those utilized by telephone companies for inter and intra-city communication.

Therefore, it is an object of this invention to provide a new and improved method of identifying conductors or conductor pairs in a multiconductor cable.

It is another object of this invention to provide a new and improved apparatus for identifying conductors or conductor pairs in a multiconductor cable.

It is a further object of this invention to provide a new and improved method of and an apparatus for identifying conductors or conductor pairs in a multiconductor cable which requires no special or complicated apparatus at a remote location and operates without interference to telecommunication or other services carried by the conductors or conductor pairs being identified.

It is still a further object of this invention to provide a new and improved method of and an apparatus for identifying conductors or conductor pairs in a multiconductor cable which provides for the simultaneous and continuous availability of identification signals on all conductors or conductor pairs to be identified.

It is also an object of this invention to provide a new and improved method of and an apparatus for identifying in a rapid and accurate manner the individual conductors or individual conductor pairs in a multiconductor cable over relatively long distances in the order of five miles, for example, as well as over relatively short distances.

It is yet another object of this invention to provide a method of and an apparatus for identifying conductors or conductor pairs in a multiconductor cable which only requires a single operator or user.

SUMMARY OF THE INVENTION

In accordance with principles of this invention, a new and improved method of identifying the conductors or conductor pairs of a multiconductor cable is provided. The method comprises the steps of: generating audio frequency electrical waveforms related to spoken words; and applying the word waveforms to the conductors or conductor pairs of a multiconductor cable. In addition, preferably, the method also comprises the steps of assembling the individual word waveforms into a plurality of simultaneous reoccurring and continuously available word sequence waveforms; simultaneously applying the thusly assembled word sequence waveforms to the plurality of conductors or conductor pairs of the multiconductor cable on a one-to-one basis; and, sequentially connecting an audio transducer to the other end of a particular conductor or conductor pair to detect the word sequence waveform applied to that particular conductor or conductor pair and, thereby, identify it.

In accordance with further principles of this invention, an apparatus for carrying out the method steps outlined in the preceding paragraph is provided. The apparatus generally comprises a speech waveform generator that simultaneously generates a plurality of waveforms related to spoken words, and a control means for simultaneously applying the word waveforms to the conductors of the multiconductor cable whose conductors or conductor pairs are to be identified. Preferably, prior to their application to the conductors of the multiconductor cable, the word waveforms are combined in word combination networks so that word sequence waveforms are created. The word sequence waveforms are then applied to the individual conductors or conductor pairs of the multiconductor cable whose conductors or conductor pairs are to be identified.

In accordance with further principles of this invention, the speech waveform generator comprises a storage medium suitable for storing information related to spoken words on a plurality of tracks which can be simultaneously read. The speech waveform generator also includes means for reading the tracks and applying audio frequency electrical waveforms to a plurality of output lines, each of said lines being related to one of said tracks.

In accordance with further principles of this invention, the audio frequency electrical waveform outputs (word waveforms) of the speech waveform generator are applied to a speech waveform switching circuit controlled by a control logic circuit. The control logic circit controls the speech waveform switching circuit so that groups of word waveforms are sequentially applied to a word combination network, the first group being related to the first word of a word sequence, the second group being related to the second word, etc. The word combination network combines the first, second, and subsequent groups of word waveforms into word sequence waveforms each comprising one or more word waveforms. The apparatus of the invention also comprises an enabling network for applying the word sequence waveforms developed by the word combination network to the conductors of the multiconductor cable under test via a coupling network.

It will be appreciated from the foregoing brief summary that a new and improved method of and an apparatus for identifying the individual conductors or conductor pairs of a multiconductor cable is provided by the invention. Because the invention can simultaneously apply audio signals related to spoken words to one end of the plurality of conductors under test, the conductors are readily, rapidly identifiable at the other end of the conductors by simply connecting an audio transducer (such as a set of lineman's earphones, for example) to a particular conductor or conductor pair if only one is to be identified, or sequentially to all conductors or conductor pairs if they all are to be identified. The apparatus of the invention can be permanently affixed to the conductors to be identified or can be temporarily connected to one end of an existing cable line only during the test or identification period and, thereafter, removed. Moreover, a single apparatus made in accordance with the invention can be used to simultaneously identify the conductors of a plurality of cables, i.e., it can be used to identify the conductors or conductor pairs of a multitude of multiconductor cables at the same time. In addition, the invention can identify the conductors of signal-carrying multiconductor cables without destroying the signals, i.e., the invention can be used to identify the conductors of cables in use while they are in use. Further, the apparatus of the invention is relatively uncomplicated and can be formed from either discrete or integrated circuit components and the like, as desired. Thus, the apparatus of the invention is inexpensive to produce and is reliable, and therefore suitable for widespread use. Furthermore, the invention can be utilized to identify the conductors of relatively long cables, i.e., five miles, for example, without detrimental signal deterioration. Moreover, the invention requires only a single operator or user. Hence, the above-noted disadvantages of prior art cable conductor identification processes and apparatus are overcome by the invention.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
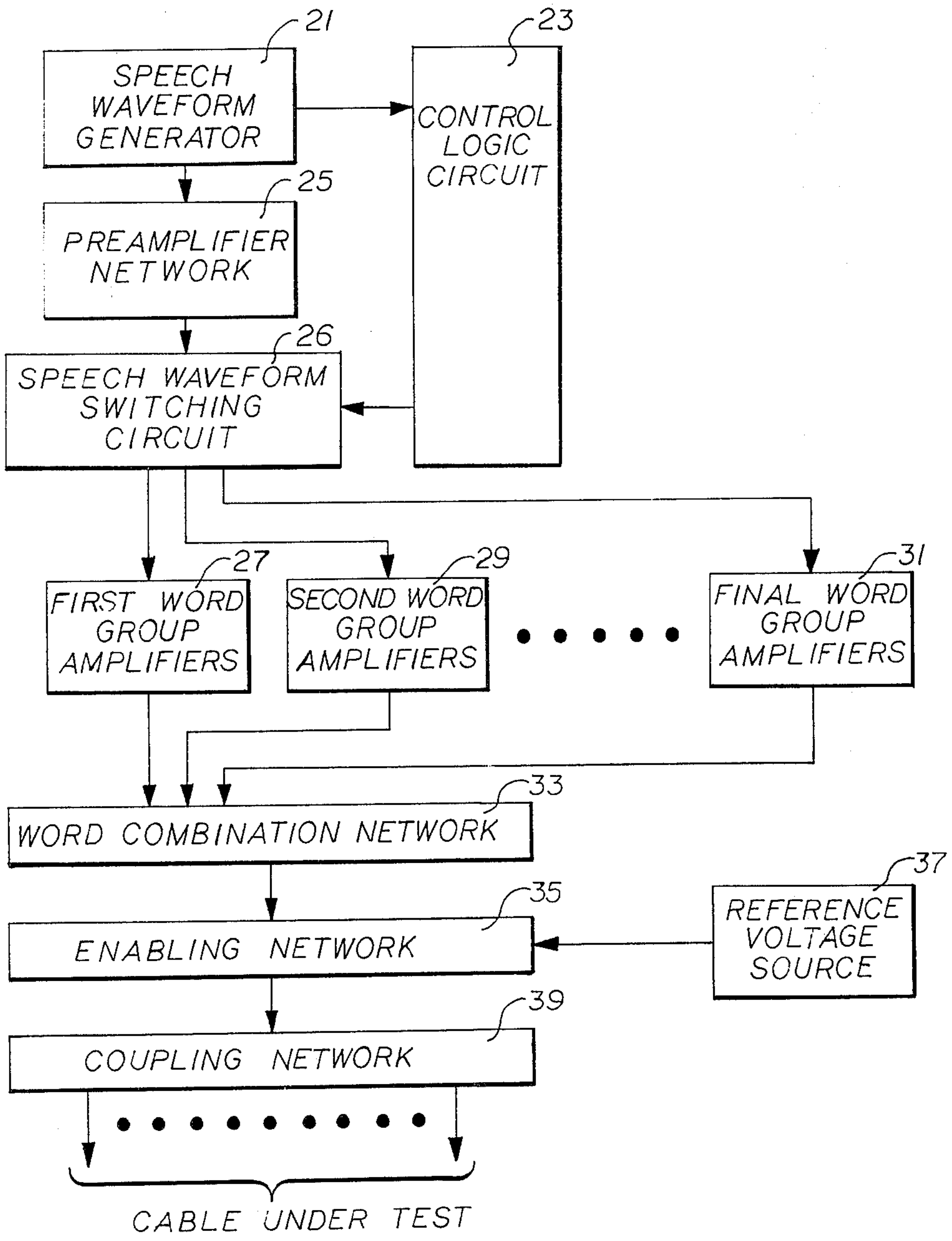
FIG. 1 is a block diagram of an apparatus suitable for carrying out the method of the invention.

FIG. 1 is a block diagram illustrating the method of the invention and a preferred embodiment of an apparatus for carrying out the method. FIG. 1 comprises: a speech waveform generator 21; a control logic circuit 23; a preamplifier network 25; a speech waveform switching circuit 26; first word group amplifiers 27; second word group amplifiers 29; final word group amplifiers 31; a word combination network 33; an enabling network 35; a reference voltage source 37; and, a coupling network 39.

As will be better understood from the following description, the speech waveform generator 21 simultaneously generates a plurality of audio frequency electrical waveforms (audio signals) related to spoken words, such as the integers 0 through 9, for example. In addition, the speech waveform generator 21 generates audio frequency electrical waveforms related to a predetermined number of cardinal suffixes, such as "hundred," "thousand," etc. The speech waveform generator also generates control pulses at the beginning and at the end of its simultaneous generation of audio signals related to integers and cardinal suffixes.

The audio signals generated by the speech waveform generator are applied to the preamplifier network 25 and the control pulses are applied to the control logic circuit 23. The preamplifier network 25 includes audio preamplifiers which amplify the received audio signals and apply the amplified signals to the speech waveform switching circuit 26. Meanwhile, the control logic circuit, in accordance with the control pulses received from the speech waveform generator, applies a tone burst to the speech waveform switching circuit followed by gating signals which cause the speech waveform switching to sequentially apply first, second, etc., (through final) signals to the first, second, etc., word group amplifiers 27, 29 and 31.

The first through final word group amplifiers amplify the received audio signals and apply the amplified signals to the word combination network 33. The word combination network 33 combines the thusly amplified first through final word audio signals into word sequence audio signals and applies these signals to the enabling network 35.

The enabling network 35 also receives a reference voltage from the reference voltage source 37. The reference voltage allows the enabling network, upon receipt of word sequence audio signals and under specific (later described) voltage conditions at its output terminal, to apply the word sequence audio signals to the coupling network 39. The coupling network in turn couples the output from the enabling network to the individual conductors or conductor pairs of the multiconductor cable whose conductors or conductors pairs are to be identified in a manner more fully described hereinafter.

As will be appreciated from FIG. 1 and the previous description, the method of the invention generally comprises the steps of generating audio word related signals and simultaneously applying these signals to the conductors of a multiconductor cable whose conductors are to be identified. The preferred more specific method steps comprise: simultaneously generating a plurality of audio signals, preferably related to integers and cardinal suffixes therefore, and control pulses; applying the audio signals to a speech waveform switching circuit controlled by the control pulses; combining the audio signals to form audio signal sequences related to word sequences; and, applying the audio signal sequences to the conductors of the cable. In addition, the method of the invention comprises listening to the audio signal sequences, applied to the conductors to identify a particular conductor or pair of conductors of a multiconductor cable, at the end of the cable remote from the point where the audio signal sequences are applied.

The apparatus of the invention generally comprises a speech waveform generator means for generating audio frequency electrical waveforms (audio signals) related to words (preferably integers), and electrical control pulses. The control pulses are utilized to control the application of the audio signals to a word combination netword via suitable amplifier means. The word combination network combines the audio signals into suitable word sequence audio waveforms (audio signal sequence). The audio signal sequences are applied to the cable under test via suitable enabing and coupling networks.

Preferably, the enabling network includes enabling circuits which operate independently for each and every connected conductor or conductor pair. The enabling network as hereinafter described is primarily required when the multiconductor cable under test is relatively long — in the order of miles — and may be omitted when the cable is of lesser length. Thus, the enabling network also may be omitted when the invention is utilized to identify the conductors or conductor pairs of wiring harnesses.

The coupling network applies the audio signal sequences to the conductors of the cable under test and is included to protect the conductors from the audio signal sequences having a deleterious effect on communication or other signals carried by the conductors during the identification period. In other words, the output coupling network is included to protect the cable conductors where consideration of line balance, signal level and circuit bridging impedances are of particular significance, and where protection of the apparatus of the invention from the electrical environment in which it is being used is a necessity. In other circumstances, where these factors are not of particular significance, the coupling networks also may be eliminated.

Speech Waveform Generator

Figure 2:
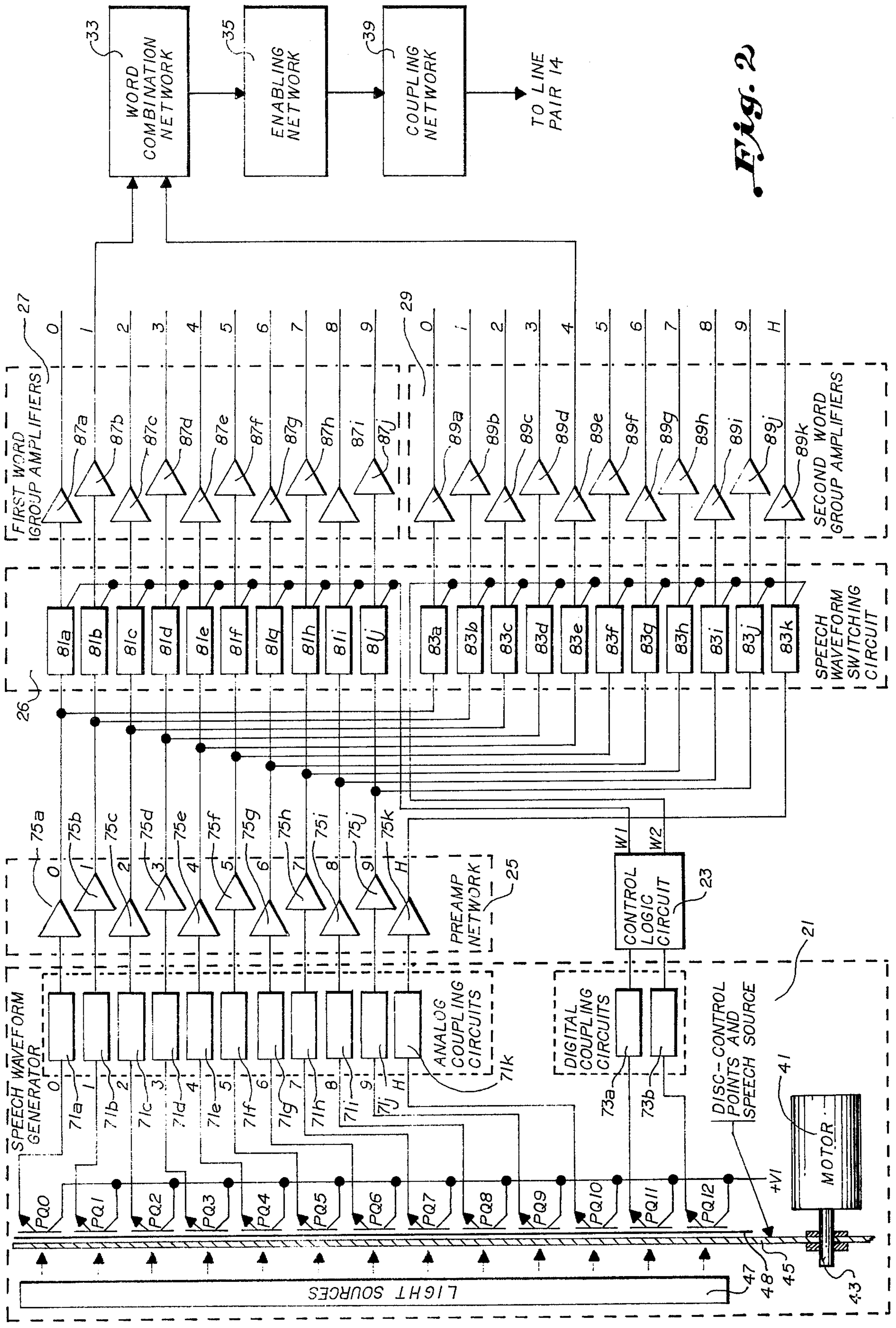
FIG. 2 is a partially block, partially schematic diagram illustrating a preferred embodiment of the apparatus of the invention.

FIG. 2 is a more detailed diagram, partially in block and partially in schematic form, illustrating a preferred embodiment of an apparatus formed in accordance with the invention. The speech waveform generator 21 illustrated in FIG. 2 comprises a motor 41 having a shaft 43. A disk 45 is mounted on the shaft 43 and rotates between a light source 47 and a plurality of phototransistors designated PQ0–PQ12 placed behind a common radial optical slit 48.

Figure 3:
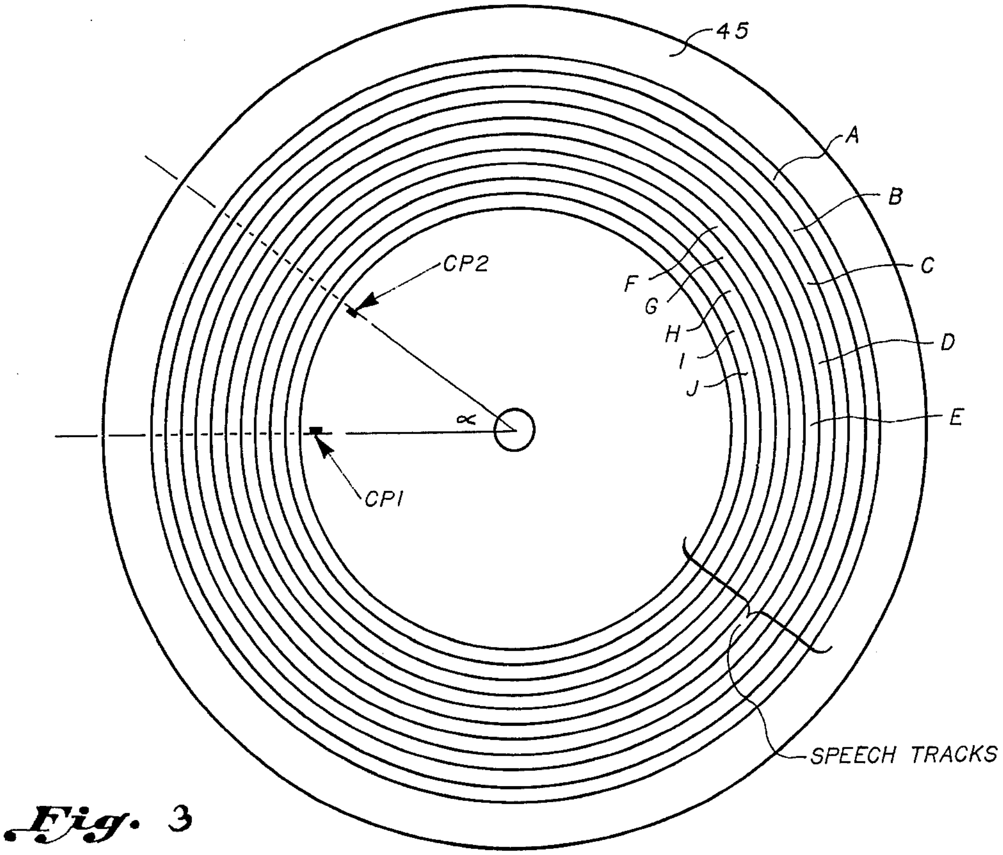
FIG. 3 is a pictorial diagram of an optical record suitable for storing, in parallel, word information and control signals.

This disk 45 is, preferably, formed of optical quality tempered glass and, as illustrated in FIG. 3, includes a plurality of concentric tracks whose light transmissibility varies in accordance with well-known optical principles so that when the disc rotates between a light source 47 and suitable light sensing devices, such as phototransistors PQ0–PQ10, electrical signals are generated. By suitably controlling the light transmissibility of the tracks, the generated electrical signals can take on the form of audio frequency electrical waveforms related to words, such as integers and cardinal suffixes, for example. Thus, the disk 45 forms an optical record.

As illustrated in FIG. 3, the disk 45 contains eleven concentric tracks designated A thru K. However, a greater or lesser number of tracks may be contained on the disc, as determined by the number of conductor or conductor pairs to be identified. In addition to the tracks A thru K, located inwardly from the innermost track (K) are a pair of very small light passing regions designated CP1 and CP2 (for control point one and control point two). CP1 and CP2 are located at different radial distances from the center of the disk 45. In addition, the CP1 and CP2 are located on different radii separated by a predetermined acute angle alpha ($\alpha$). Thus, as the disk 45 is rotated by the motor 41, in the direction of the arrow illustrated in FIG. 3, CP1 passes a predetermined fixed radius line prior to CP2 passing the same radius line. As will be better understood from the following description, the passage of CP1 and CP2 through a predetermined radius line causes the generation of control pulses by PQ11 and PQ12 which are utilized by the control logic circuit to control the gating of the audio frequency electrical waveforms, generated as a result of the tracks A thru K passing between the light source 47 and photo-transistors PQ0 and PQ10, by the speech waveform switching circuit.

As illustrated in FIG. 2, the light source 47 is mounted on one side of the disk 45 along a suitable radius line and emits light beams which intersect the tracks A thru K as they pass through the chosen radius line. These light beams are "modulated" by the variable transmissibility of the tracks. The photo-transistors PQ0–PQ12 are mounted on the other side of the disk along the same radium line and view the tracks through the optical slit 48. Thus, the photo-transistors receive or detect the modulated light beams. The photo-transistors are mounted and the tracks are formed such that track A passes between a light beam and photo-transistor PQ0 and causes PQ0 to generate an audio frequency electrical waveform representing the integer 0; track B passes between a light beam and PQ1 and causes PQ1 to generate an audio frequency electrical waveform representing the integer 1; track C passes between a light beam and PQ2 and causes PQ2 to generate an audio frequency electrical waveform representing the integer 2; etc. through track J and the integer 9. Thus, PQ0 through PQ9 generate audio frequency electrical waveforms representing the integers 0 through 9, respectively. Track K passes between a light beam and PQ10 causing PQ10 to generate an audio frequency electrical waveform representing the term "hundred." Hundred is the only cardinal suffix generated by the illustrated embodiment of the invention. However, it will be appreciated that if desired, additional tracks and related apparatus could be added so that audio frequency electrical waveforms representing higher cardinal suffixes such as thousand, million, etc. could be generated.

PQ11 is mounted so that CP2 passes between it and a light beam. Thus, PQ11 generates a pulse each time CP2 passes through the radius line defined by the light source 47 and the photo-transistors. Similarly PQ12 is mounted so that CP1 passes between it and a light beam causing PQ12 to generate a pulse when it passes through the defined radius line.

The collectors of PQ0–PQ12 are connected to a suitable voltage source designated +V1 and the emitters of PQ0 through PQ10 are each connected to one of a plurality of analog coupling circuits 71*a*–71*k* also forming a part of the speech waveform generator. The analog coupling circuits are conventional, and each may comprise a single capacitor and a single resistor, the resistor being connected between the associated photo-transistor and a suitable voltage source (negative with respect to +V1), and the capacitor being connected between the emitter of the associated photo transistor and the input of the preamplifier network 25. The emitters of PQ11 and PQ12 are each connected via digital coupling circuits 73*a* and 73*b* to inputs of the control logic circuit 23. The digital coupling circuits are also conventional and may comprise a direct connection with the direct connection being connected via a suitable resistor to a suitable voltage source (also negative with respect to +V1).

Control Logic Circuit

Figure 4:
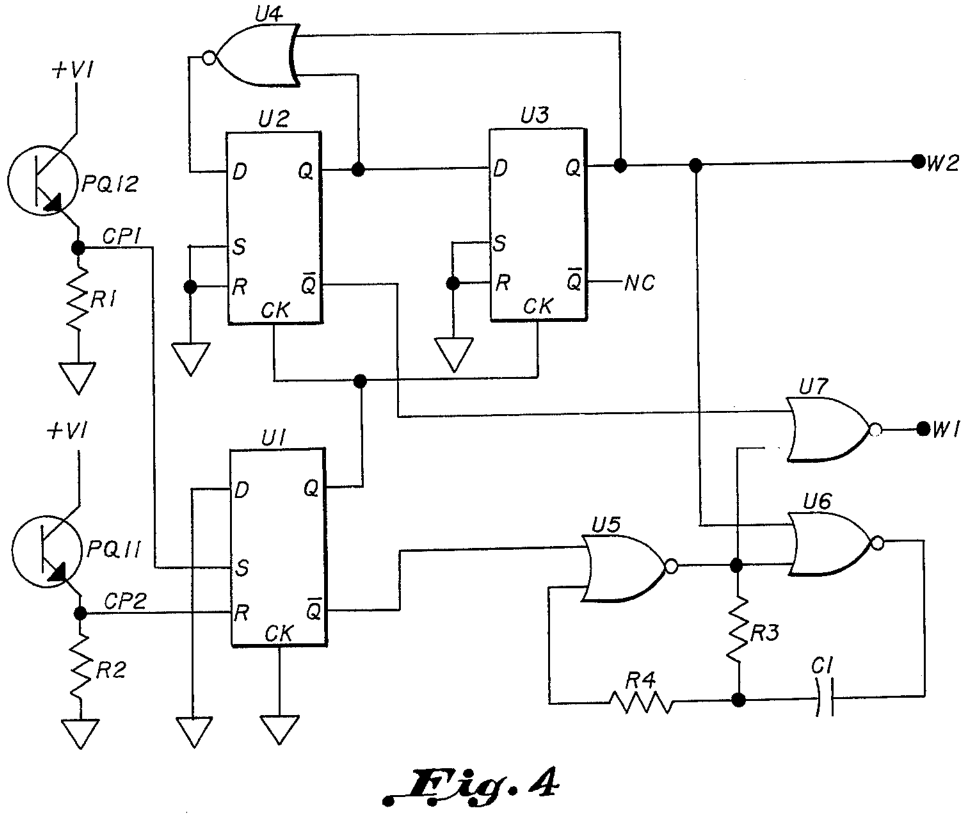
FIG. 4 is a partially block, partially schematic diagram illustrating a control logic circuit suitable for use in the embodiment of the invention illustrated in FIG. 2.

A preferred embodiment of the control logic circuit is illustrated in FIG. 4 and comprises: PQ11 and PQ12; four resistors designated R1, R2, R3 and R4; a capacitor designated C1; three bistable flip-flops designated U1, U2 and U3; and, four NOR gates designated U4, U5, U6, and U7. All four of the NOR gates are two-input NOR gates.

The collectors of PQ11 and PQ12 are connected to +V1. The emitter of PQ12 is connected through R1 to the common terminal of the hereinafter described power supply, and the emitter of PQ11 is connected through R2 to the common terminal of the power supply. R1 and R2, in an actual embodiment of the invention, form the above described digital coupling circuits 73*a* dn 73*b*.

The emitter of PQ12 is also connected to the set (S) input of U1 and the emitter of PQ11 is connected to the reset (R) input of U1. The clock (CK) and data (D) terminals of U1 are connected to the common terminal of the power supply. The Q output of U1 is connected to the clock inputs of U2 and U3 and the $\overline{Q}$ output of U1 is connected to one input of U5. The output of U5 is connected to one input of U6 and the output of U6 is connected through C1 in series with R4 to the other input of U5. The junction between R4 and C1 is connected through R3 to the junction between the output of U5 and its associated input of U6. The junction betweeen the output of U5 and its associated input of U6 is also connected to one input of U7. The other input of U7 is connected to the $\overline{Q}$ output of U2. The set and reset inputs of U2 are connected to the common terminal of the power supply, as are the set and reset inputs of U3. The Q output of U2 is connected to the data input of U3 and the Q output of U3 is connected to one input of U4. The other input of U4 is connected to the Q output of U2, and the output of U4 is connected to the data input of U2. The Q output of U3 is also connected to the other input of U6. The output of U7 is connected to one output terminal designated W1 (to designate word one) and the Q output of U3 is connected to a second output terminal designated W2 (to designate word two).

In general, it will be appreciated from viewing FIG. 4 that U5 and U6 in combination with R3, R4 and C1 represent a tone generator which oscillates at a predetermined frequency when the $\overline{Q}$ output of U1 is in its binary 0 state and the Q output of U3 is in its binary 0 state. As will be better understood from the following description, the tone generator is designed to generate an audio signal, preferably in the frequency range around 500 Hertz, to identify the start of a word or word sequence.

It will also be appreciated from viewing FIG. 4 that U2, U3, and U4 form a shift register wherein the output of U4 is shifted sequentially from U2 through U3. Alternatively, from another point of view, these elements represents a three state counter. In addition, U1 forms a pulse generator which applies pulses to the components connected to its Q and $\overline{Q}$ outputs. These pulses control oscillation by the oscillator and shifting of the shift register.

Figure 5:
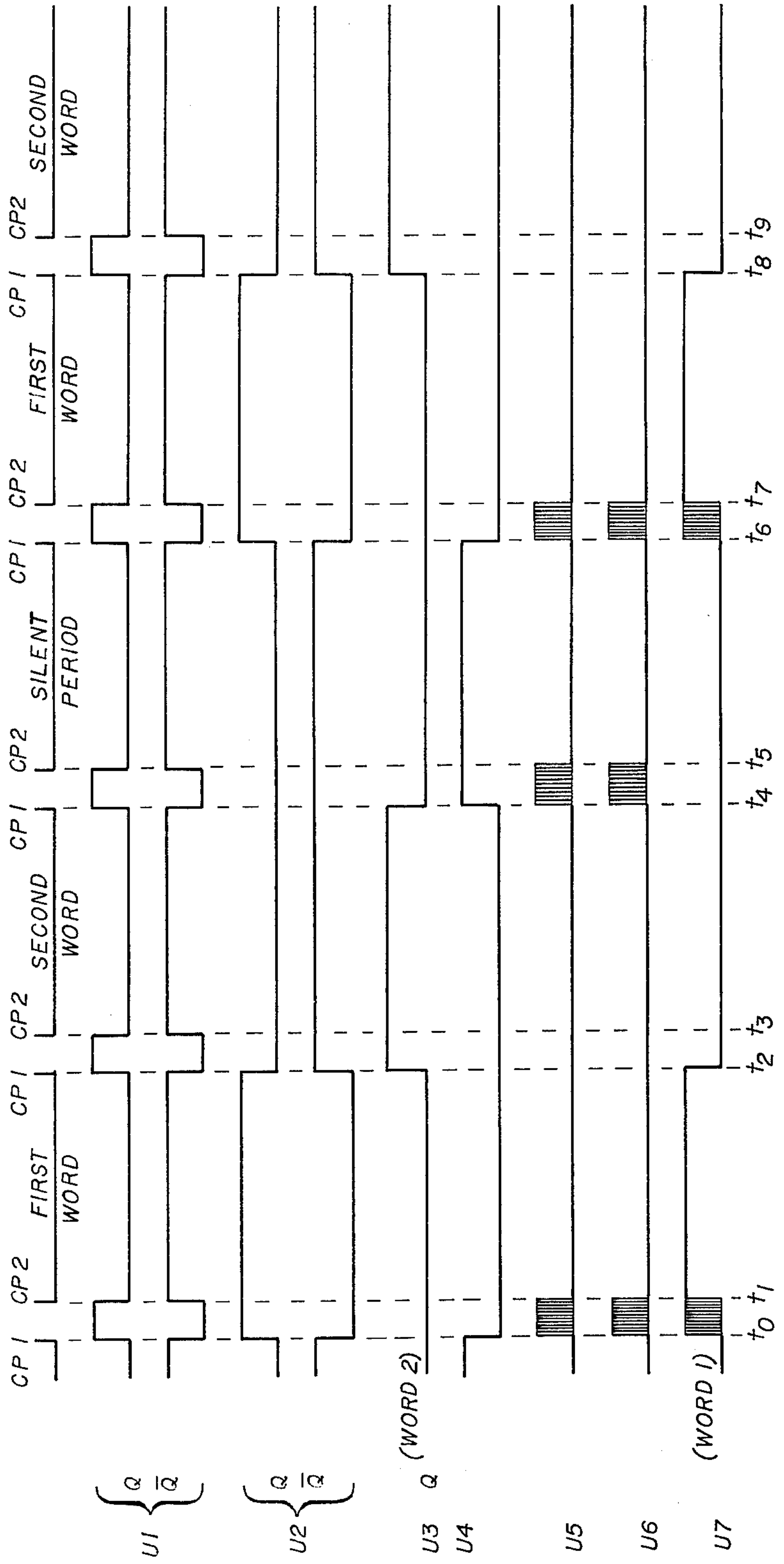
FIG. 5 is a timing diagram for the logic circuit illustrated in FIG. 4.

To better understand the operation of the control logic circuit illustrated in FIG. 4 reference is now made to the control logic circuit timing diagram illustrated in FIG. 5. The sequence of operation of the control logic circuit is such that a tone burst is first generated and applied to W1. A first word gate signal, a second word gate signal and a silent period follow the tone burst, in that order. Thereafter, the sequence repeats itself.

Assuming that a silent period has just occurred, the Q output of U2 is in its binary 0 state, as is the Q output of U3. Since U4 is thus receiving a binary 0 on both inputs, its output is a binary 1. In addition, U1 is reset, i.e. its Q output is in its binary 0 state and its $\overline{Q}$ output is in its binary 1 state.

At the end of the silent period CP1 passes between PQ12 and a light beam from the light source 47. When this acts occurs, a pulse is applied to the set input of U1 causing its outputs to reverse states. When this change occurs, a clock pulse is applied by the Q output of U1 to the clock input of U2 causing the 1 on the output of U4 to be shifted into U2. Thus, the Q output of U2 switches from its previous binary 0 state to its binary 1 state and the $\overline{Q}$ output of U2 shifts from its previous binary 1 state to a binary 0 state. The staus of U3 does not change since the previous Q output of U2 was a binary 0 . In any event, the binary 0 on the Q output of U3 (applied to one input of Q6) allows the tone generator to oscillate at its chosen audio frequency. This oscillation signal is gated to the first output terminal W1 because at this point in time (between $t_0$ and $t_1$) U7 is receiving a binary 0 from the $\overline{Q}$ output of U2. Thus, until CP2 passes between the light source 47 and PQ11 an audio tone is applied to W1. W2 during this period of time is in a binary 0 state because the Q output of U3 is in its binary 0 state. When CP2 passes between its associated beam of light and PQ11, a reset pulse is applied to U1 causing it to reset. Resetting of U1 applies a binary 1 to its associated input of U5 causing the oscillations to terminate. Since both of the inputs to U7 are now binary 0's, the W1 output is a binary 1. The W2 output retains its previous binary 0 state. During the following period of time ($t_1 - t_2$), as will be better understood from the following description, audio frequency electrical waveforms representing the first "word" in a sequence of words are generated by PQ0–PQ10 and applied via their associated analog coupling circuits 71*a*–71*k* to the preamplifier network 25 and, thence, to the speech waveform switching circuit 26 where they are gated to the first word amplifiers 27.

As the disk continues to revolve, after the audio frequency electrical waveforms related to the first "words" are genereted, CP1 again causes a pulse to be applied to the set input of U1. When this action occurs, the outputs of U1 again switch states ($t_2$), and clock pulses are applied to U2 and U3 causing the binary 1 on the Q output U2 to be shifted into U3. In addition, because the output of U4 was previously a binary 0, a binary 0 is shifted into U2 causing its outputs to also switch states.

At $t_3$, CP2 again passes between a light beam and PQ11 causing U1 to reset. After U1 resets, a second set of audio frequency electrical waveforms are generated by PQ0–PQ10. During this period of time ($t_3$–$t_4$), W2 is at a binary 1 state and W1 is at a binary 0 state. More specifically, W1 is at a binary 0 because the $\overline{Q}$ output of U2 is in its binary 1 state. W2 is at a binary 1 state because the Q output of U3 is in its binary 1 state. It should be noted that from $t_2$ to $t_3$ no tone was generated because the oscillator was inhibited due to the Q output of U3 being in its binary 1 state.

At $t_4$ a pulse is again applied to the set input of U1 because CP1 again passes between a light beam and PQ12. This pulse causes U1 to clock U2 and U3 so that the previous 0 in U2 is shifted into U3. Since just prior to $t_4$ the output of U4 was a binary 0, a binary 0 is shifted into U2 and its Q and Q outputs do not change states. However, the binary 0 shifted into U3 causes its outputs to change status whereby its Q output changes to its binary 0 state and its $\overline{Q}$ output changes to its binary 1 state.

When U1 is set at $t_4$, the oscillator again starts to generate a tone signal at the chosen frequency. However, this signal is not applied to output W1 because U7 is inhibited by the $\overline{Q}$ output of U3 being in its binary 1 state. Not only is a tone not passed between $t_4$ and $t_5$, since both W1 and W2 are at binary 0 states from $t_5$ to $t_6$, as will be better understood from the following description, the speech waveform switching circuit is prevented from passing the audio frequency electrical waveforms generated by PQ0–PQ10. Thus a silent period occurs between $t_4$ and $t_6$. At $t_6$, passage of CP1 between a light beam and PQ12 sets U1 and the cycle repeats itself, as illustrated in FIG. 5.

Preamplifier Network

The outputs from the analog coupling circuits 71*a*–71*k* are each connected to the input of one of a plurality of preamplifiers 75*a*–75*k*, respectively, making up the overall preamplifier network 25. The specific preamplifiers used may be any one of a number of audio preamplifiers well known in the amplifier art, and merely amplify the audio signals generated by PQ0–PQ10 and passed by the analog coupling circuits.

Speech Waveform Switching Circuit

The speech waveform switching circuit 26 comprises a plurality of individual waveform switches. A first set of switches 81*a*–81*j* are individually connected to the outputs of all of the preamplifiers except for the last preamplifier 75*k* i.e. the one connected to PQ10 which reproduces the word hundred. Similarly, a second set of switches 83*a*–83*k* are individually connected to the outputs of all of the preamplifiers including the last preamplifier.

Thus, switch 83k is the only switch that receives the audio frequency electrical waveform related to a suffix. All of the other switches 81*a*–81*j* and 83*a*–83*j* receive audio frequency electrical waveforms related to integers.

The first set of switches 81*a*–81*j* receive control inputs from the control logic circuit 23 by being connected to the W1 terminal of the control logic circuit. The second set of switches 83*a*–83*k* receive control inputs from the control logic circuit 23 by being connected to the W2 output of the control logic circuit 23. The switches are, in essence, gating circuits which pass the audio frequency electrical waveforms received from their associated preamplifiers 75*a*–75*k* when the W1 and W2 outputs, as the case may be, are in the binary 1 states illustrated in FIG. 5 and previously described.

Figure 6:
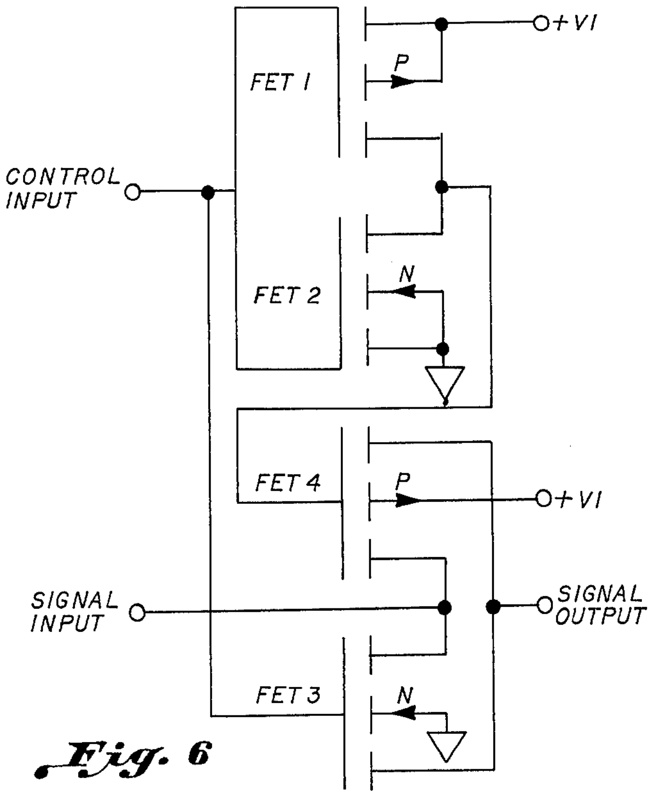
FIG. 6 is a schematic diagram of a switching circuit suitable for use in the embodiment of the invention illustrated in FIG. 2.

While the switches 81*a*–81*j* and 83*a*–83*k* can take on a variety of configurations, a preferred configuration is illustrated in FIG. 6. FIG. 6 illustrates an integrated complimentary metal oxide semiconductor (CMOS) bilateral switch. An integrated switch of this nature is manufactured by Radio Corporation of America and designated by this company as RCA CD4016.

The circuit illustrated in FIG. 6, when considered in schematic form, comprises four field effect transistors designated FET1, FET2, FET3, and FET4. FET1 and FET4 are P type field effect transistors and FET2 and FET3 are N type field effect transistors. A control input adapted for connection to terminals W1 or W2 of the control logic circuit, as the case may be, is connected to the gates of FET1, FET2, and FET3. The substrate terminal of FET1 is connected to the source terminal of FET1 and to +V1. The drain terminal of FET1 is connected to the drain terminal of FET2 and to the gate of FET4. The substrate terminal of FET2 is connected to the source terminal of FET2 and to the common terminal of the power supply. The substrate terminal of FET4 is connected to +V1 and the substrate terminal of FET4 is connected to the common terminal of the power supply. The drain terminals of FET3 and FET4 are connected together and to an input terminal connected to an associated preamplifier. The source terminals of FET3 and FET4 are connected together and to an output terminal which is connected to the input of an associated power amplifier forming a portion of the first and second word group amplifiers 27 and 29 as hereinafter described.

In operation, when a binary 1 is applied to the control input terminal by the associated output (W1 or W2) of the control logic circuit, any audio frequency electrical waveform, applied to the signal input terminal (the FET3 and FET4 drain terminals in parallel) by the associated preamplifier at the same time, is gated to the signal output terminal. Contrawise when a binary 0 is applied to the control input terminal, any audio frequency electrical waveform applied to the signal input terminal is prevented from reaching the signal output terminal. Thus, the switch illustrated in FIG. 6 is, in essence, an on - off switch controlled by the status of the control logic circuit outputs.

Word Group Amplifiers

As can be seen in FIG. 2, the first word group amplifiers 27 comprise a set of individual power amplifiers 87*a*–87*j*; and, the second word group amplifiers 29 comprise a set of individual power amplifiers 89*a*–89*k*. The inputs of the power amplifiers are each connected to the output of a single switch 81*a*–81*j*, 83*a*–83*k* so as to individually amplify the outputs of the switches.

While the powers amplifiers could take on a variety of configurations, preferably, the chosen configuration includes certain desirable features. For example, it is desirable that the power amplifiers operate from a single level power supply, have adjustable bandwidths and are free of any tendency to oscillate. Obviously, the power amplifiers must be compatible with the preamplifiers and switches employed. Moreover, they should have adequate peak-to-peak output voltage-swing capability to overcome the effect of attenuation present in the word combination network, the output enabling network, and the coupling network, if the latter networks are included. Moreover, the power amplifiers should possess certain other obvious features such as low output impedance, low inherent electrical noise, and low cost. Moreover, without damage, they must be able to withstand at their output terminals the external electrical signals produced by both transient random electrical events and intentional signals present on conductors to which they are connected, even though these signals may be attenuated by the output coupling, output enabling and word combination networks, as hereinafter described. One example of a power amplifier meeting these and other requirements is illustrated in FIG. 7.

Figure 7:
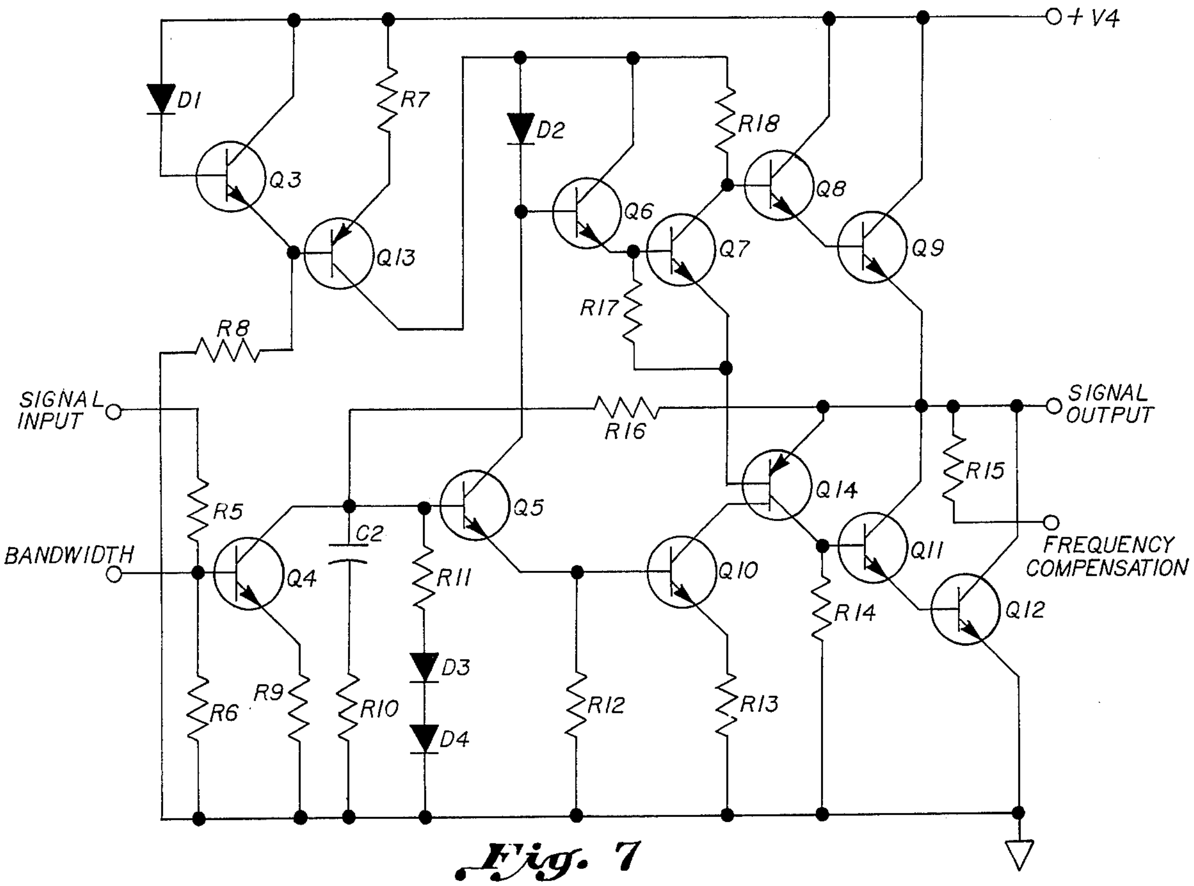
FIG. 7 is a schematic diagram of a power amplifier suitable for use in the embodiment of the invention illustrated in FIG. 2.

Since the power amplifier illustrated in FIG. 7 is well-known in the art and is identified as Motorola Circuit MC-1316, it will not be discussed in great detail here. Rather, a discussion of the circuit configuration and its general characteristics will only be provided.

The power amplifier illustrated in FIG. 7 comprises: ten NPN transistors designated Q3–Q12; one double-base PNP transistor designated Q14; four diodes designated D1–D4; fourteen resistors designated R5–R18; and, one capacitor designated C2.

A signal input terminal which is connected to the output of the associated switching circuit 81*a–j* or 83*a–k* is connected through R5 to the base of Q4. The base of Q4 is also connected to a bandwidth terminal. The bandwidth terminal is connected via a suitable capacitor (not shown) to the common terminal of the power amplifier and controls the bandwidth of the power amplifier circuit. The base of Q4 is also connected through R6 to the common terminal of the power supply which is negatively biased with respect to physical ground, as hereinafter described. The emitter of Q4 is connected through R9 to the common terminal, and the collector of Q4 is connected to the base of Q5. The base of Q5 is also connected through C2 in series with R10 to the common terminal and through R11 in series with D3 and D4 to the common terminal. The cathodes of D3 and D4 are on the common terminal side of this series circuit.

The base of Q5 is further connected through R16 to: a signal output terminal; the emitter of Q14; the collector of Q11; through R15 to a compensation terminal; the collector of Q12; and, the emitter of Q9. The collector of Q5 is connected to the base of Q6 and the cathode of D2. The collector of Q6 is connected to: the collector of Q13; the anode of D2; and, through R18 to both the base of Q8 and the collector of Q7. The emitter of Q7 is connected to one of the bases of Q14 and through R17 to the emitter of Q6 and the base of Q7. The collector of Q8 is connected to a voltage source designated +V4 and the emitter of Q8 is connected to the base of Q9. The collecotr of Q9 is also connected to +V4.

The anode of D1 is connected to +V4 and to the collector of Q3. The cathode of D1 is connected to the base of Q3, and the emitter of Q3 is connected to the base of Q13 and through R8 to the common terminal. The emitter of Q13 is connected through R7 to +V4.

The emitter of Q5 is connected to the base of Q10 and through R12 to the common terminal. The collector of Q10 is connected to the other base of Q14 and the emitter of Q10 is connected via R13 to the common terminal. The collector of Q14 is connected through R14 to the common terminal and to the base of Q11. The emitter of Q11 is connected to the base of Q12, and the emitter of Q12 is connected to the common terminal.

Signals applied to the signal input terminal of the power amplifier by its associated switch are amplified by the power amplifier and applied to the signal output terminal. When the input terminal is disconnected (open-circuited) by its associated switch, the output terminal assumes a value equal to, or nearly equal to, the voltage ap⌐lied to the common terminal. In any event, when the input terminal is disconnected, the voltage on the output terminal is adequate to reverse bias the diodes of the subsequently described word combination circuit of the word combination network to which it is connected. Conversely, when an input signal is applied to the power amplifier, the output terminal will rise to a nominal quiescent voltage value of approximately half the power supply voltage and fluctuate about that point in response to the applied audio frequency electrical waveform. This characteristic is also employed for production of the tone burst output signal which is generated by connecting and disconnecting the first word group amplifier signal input terminals of a 500 Hertz (approximate) rate through repetitive on-off cycling of switches 81*a*–81*j* by the signal on W1 (FIG. 4).

Word Combination Network

The word combination network 33 includes a plurality of word combination circuits, one for each conductor or conductor-pair served by the apparatus of the invention. More specifically, the word combination network 33 comprises a plurality of individual word combination circuits, each of which combines audio frequency electrical waveforms received from one of the power amplifiers forming the first and second group amplifiers. The resultant combination of the first and second audio frequency electrical waveforms results in a "word sequence" being created. As illustrated in FIG. 2 by way of example, the output of the second power amplifier 87*b* of the first word group amplifiers 27 is combined with the output of the fifth power amplifier 89*e* of the second word group amplifiers 29 to form the word sequence "one-four" which is composed of the word "one" and the word "four." Thus, as will be better understood from the following description, the word sequence one-four is heard by a user having a listening device (audio transducer) connected to the conductor or conductor pair identified as the one-four (14) conductor or conductor pair. In this manner, identification word sequences from zero-one (01) through one-hundred (100) are obtainable, zero-zero being eliminated unless its use is desired. It should be noted, that the invention can be expanded to increase the word sequences to three or more word sequences, as desired, by merely expanding the apparatus of the invention to expand its capability.

It is desirable for the word combination circuits to introduce a minimum amount of attenuation to the word sequences and withstand, without damage, the application of external electrical signals to their output terminals. In addition, it is most important that these circuits pass only one word sequence and not more than one word sequence.

Figure 8:
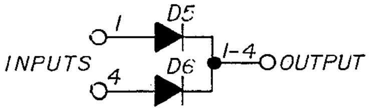
FIG. 8 is a schematic diagram of a word combination circuit suitable for use in the embodiment of the invention illustrated in FIG. 2.

A schematic diagram of a word combination circuit that meets the foregoing requirements is illustrated in FIG. 8 and comprises a pair of diodes designated D5 and D6. For consistancy the particular word combination circuit illustrated in FIG. 5 combines the word amplified by the second power amplifier 87*b* of the first word group amplifiers with the word amplified by the fifth power amplifier 89*e* of the second word group amplifiers to form the word sequence one-four (14). The output of the "second" amplifier 87*b* is applied to the anode of D5 and the output of the "fifth" amplifier 89*e* is applied to the anode of D6. The cathodes of D5 and D6 are connected together and to an output terminal. A pair of diodes of this nature is used to combine the output of each of the power amplifiers 87*a*–87*j* of the first word group amplifiers 27 with the output of each of the power amplifiers 89*a*–89*k* of the second word group amplifiers 29 to obtain the sequences zero-one (01) through one-hundred (100), zero-zero (00) not being used. Thus, one hundred conductors or conductor pairs can be identified by the illustrated apparatus.

By referring back to the previous description, it will be appreciated that after the tone burst the word one passes through D5 because its associated switch 81*b* is gated on by the W1 output terminal of the control logic circuit 23 being at a binary 1 state. This is time period $t_1$–$t_2$ (FIG. 5). The word one is followed by the word four during the $t_3$–$t_4$ time period because during this period the switch 83*e* associated with D6 is gated on by the binary 1 on terminal W2 of the control logic circuit 23. Thus, the control logic circuit sequentially gates all of the first, then all of the second groups of switches "on" and the word combination circuits are wired to "chose" particular words during the "on" periods of each and sequentially combine them.

Enabling Network

The enabling network 35 comprises a plurality of enabling circuits equal in number to the number of circuits making up the word combination network, and hence equal in number to the total number of conductor pairs served by the apparatus of the invention. Thus, the output of an individual word combination circuit is connected to the input of an associated enabling circuit. Each enabling circuit functions to connect or disconnect identification signals from its associated word combination circuit to a related output coupling circuit forming a part of the coupling network 39 hereinafter described. Control of the output enabling circuits is executed on an independent, individual conductor (or conductor pair) basis. Preferably, the output enabling circuits exhibit certain predetermined characteristics. One of these characteristics is the desirability that they be turned on by voltage variations at their output terminals. They should also be capable of being turned off upon the application of a specific value of voltage to their input terminal. Further, the output enabling circuits should employ a minimum number of components; introduce a minimum amount of attenuation to the identification word sequences; and, without damage, be able to withstand at their output terminals the application of external electrical signals produced both by transient random electrical events and by intentional signals present on the conductors to which they are connected, as attenuated by their associated output coupling circuits.

Figure 9:
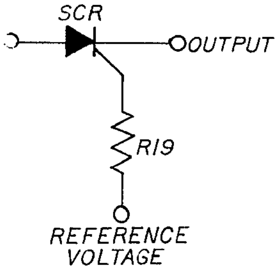
FIG. 9 is a schematic diagram of an output enabling circuit suitable for use in the embodiment of the invention illustrated in FIG. 2.

An enabling circuit that meets the requirements described in the foregoing paragraph is illustrated in FIG. 9 and comprises a silicon controlled rectifier designated SCR and a resistor designated R19. The anode of SCR is connected to an input terminal which is connected to the output of the associated word combination circuit. The cathode of SCR is connected to an output terminal which in turn is connected to the input of a suitable coupling circuit hereinafter described. The gate of SCR is connected through R19 to a suitable reference voltage source.

As will be understood by those skilled in the art, an SCR is a four-layer semi-conductor element wherein the anode-to-cathode flow of conventional current is initiated when current is caused to flow from gate-to-cathode. Once initiated, anode currents continue to flow to the cathode even though gate currents have ceased to exist. Anode current ceases to flow only if forced to do so by external means, such as by dropping the anode-cathode voltage to zero or open circuiting the anode-cathode circuit.

As previously indicated, each word combination circuit output is wired directly to an anode of an enabling circuit SCR. The quiescent output voltage of any related word-group power amplifier, when connected to a preamplifier 75 by an associated switch 81, is transmitted through its associated word combination circuit and provides the anode circuit potential necessary for SCR operation. During the "silent" period (see FIG. 5) the power amplifier outputs drop to a level insufficient to forward bias the associated word combination network diodes and SCR anode-gate and anode-cathode junctions with respect to the reference voltage existing at the gates of the SCRs or the normal voltage at the cathodes of the SCRs, thereby permitting turn off of all enabling SCRs.

Turn-on of any enabling SCR is accomplished in the hereinafter described manner; all gate terminal are connected to a common reference voltage adjusted to a value equal to (or slightly more negative than) the normal voltage expected at the input terminal of the related output coupling circuit, i.e. the cathode of the SCR. This voltage (the voltage at the cathode) is normally equal to the arithmetic average value of the DC voltages existing on the conductors or the conductor pairs to which the balanced coupling circuits, hereafter described, are connected. In, for example, telephone central offices this voltage is equal to one-half of the central office battery voltage, regardless of whether the related circuit is idle or busy--that is regardless of whether or not the subscriber's telephone instrument is "on-hook" or "off-hook." Therefore, under normal circumstances, there is no gate-cathode voltage difference and hence no gate-cathode current available to initiate anode-cathode current flow. When, however, currents are caused to flow in a related cable conductor or conductor pair by means of a return path DC signalling circuit, as hereinafter described, then the SCR cathode terminal voltages will become more negative than the gate (reference) voltage and cause gate-cathode current flow and SCR turn-on. At this point, power amplifier output voltage variations (words) will be applied through the associated enabling and coupling circuits to the associated conductor or conductor pair. R19 is employed to limit the magnitude of anode-gate current flow during periods when the output of the enabling circuit SCRs are turned "on."

Coupling Network

As previously indicated, the coupling network 39 comprises a plurality of separate coupling circuits each adapted to connect a single conductor or conductor pair to the output of one of the enabling circuits. If the enabling circuit outputs are to be connected to single conductors, a direct connection, or a simple direct resistive connection can be used, as desired. On the other hand if the enabling circuit outputs are to be connected to conductor pairs, then coupling circuits of the type illustrated in FIG. 10 are preferable.

Figure 10:
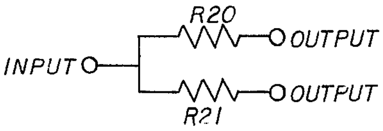
FIG. 10 is a schematic diagram of an output coupling network suitable for use in the embodiment of the invention illustrated in FIG. 2.

FIG. 10 illustrates a coupling circuit comprising a pair of resistors R20 and R21. The input to the coupling circuit from the associated enabling circuit is connected to one end of both R21 and R21. The other ends or R20 and R21 are each connected to one of the conductors of the conductor pair. R20 and R21 are equally matched to a preferable accuracy of 1/10th of one per cent of their nominal value, or better. A coupling circuit of the type illustrated in FIG. 10 introduces an acceptable amount of attenuation to the words passed by the enabling circuits whereby the apparatus of the invention can be used over the greatest possible distance without exceeding the maximum permissible levels for applied common-mode voltages — the voltages which produce longitudinal currents in the cable pairs.

The output circuit illustrated in FIG. 10 produces negligible degradation of existing line-balance conditions on the associated conductor pair and provides controlled bridging impedance between the conductors of the related conductor pair. The output circuit illustrated in FIG. 10 also gives to the other system components necessary protection against transient random electrical events and intentional signals (especially telephone ringing signals) present on the conductors of the associated conductor pair. Moreover, an output circuit of this nature applies to the associated cable pair words having an essentially zero differential-mode (metallic) component so that the identification signal is not sensed by telecommunications systems connected to the conductor pair. That is, the words are silent with respect to telephone subscribers, for example. Finally, this output circuit provides at its input terminal a DC potential which is accurately equal to the arithmetic average of the DC voltages on each conductor of the conductor pair to which the coupling circuit is connected and, thereby, meets one of enabling circuit requirements discussed above. This aspect is important because, when the invention is used in a typical central office telephone service system, the voltage on the output of the enabling SCRs must be closely equal to one half of the central office battery voltage, regardless of whether the particular cable pair is busy or idle.

As a practical matter, the output terminals of the coupling circuits are directly connected to the terminals of output connectors placed on the front panel of the cabinet housing the apparatus of the invention. The output connector is, preferably, of a standard configuration and type employed by the system incorporating the cable whose conductors or conductor pairs are to be identified. Thus, the invention is readily interconnected to specific multiconductor cables by means of available mating cable connector assemblies.

Summary

It will be appreciated at this point that a complete system for identifying the conductors or conductor pairs of a multiconductor cable has been illustrated and described. To summarize, audio frequency waveforms representing integer words are reproduced from a suitable recording or storage medium, amplified and combined prior to being applied to the conductors or conductor pairs to be identified. These waveforms or words are applied to one end of the cable. While the words are usually applied at a central station, they can be applied at any other access point, as desired. After connecting the previously described apparatus of the invention to one end of the cable, the user energizes the apparatus and audio frequency electrical waveforms (words) are simultaneously available to the conductors at predetermined intervals, such as once every three seconds, for example. Thereafter, the user physically moves to the other end of the cable which may, as previously indicated, be several miles in length. He then sequentially attaches a conventional audio transducer, such as a "lineman's" telephone headset, to the conductors and listens for the words applied to each conductor to determine the identity of each conductor. Preferably, in this manner, conductors are readily identified by the user. In conclusion, the invention provides a method of and an uncomplicated apparatus for easily and rapidly identifying the conductors or conductor pairs of a multiconductor cable in a variety of environments.

Return Path Circuit

While in many cases, a physical ground path or the cable sheath can form a return path for the audio frequency electrical waveforms applied to the conductors or conductor pairs, in many circumstances it is desirable that these types of return paths be avoided. As hereinafter described, the invention also provides a means which permits the use of a separate cable conductor to provide a return path. The use of a separate cable conductor return path is beneficial in that audible interferences from induced and conductive noises related to neighboring electrical power distribution systems and other sources is minimized. In addition, the use of a separate return path of this nature permits, where appropriate, allows optimum identification of individual conductors or conductor pairs in otherwise difficult circumstances. One such circumstance is that in which a long multiconductor cable is involved. In order to achieve this improvement, it is desirable and, in fact, often necessary that the auxiliary conductor be connected only to the apparatus of the invention and not simultaneously be used for other purposes. This requirement, however, is easily met in the vast majority of situations.

In general, a return path circuit should provide a low electrical impedance (minimum attenuation) to the flow of audio frequency electrical waveforms (words) between the return circuit conductor and the common terminal of the power amplifiers to which the return circuit is connected, as hereinafter described. Such a circuit should also produce DC voltages to be employed as the biasing voltages and the reference voltage connected to the enabling circuit SCRs. The return circuit should also provide a "common" terminal connection for the word-group power amplifiers. Thus the return circuit should act as a power supply as well as serve other functions. A suitable return path circuit should also provide means for rapid initial identification of the return circuit conductor from among a plurality of cable conductors at the users working location, i.e. at the remote end of the multiconductor cable whose conductors are being identified. This is of particular importance since, until the return cable conductor is located, identification of other conductors cannot conveniently proceed. The return path circuit should also apply to the return cable conductor a DC potential more negative than the most negative voltage normally encountered on any cable conductor, so as to provide a means for producing longitudinal direct current flow of the correct polarilty on any conductor pair and, thereby, control the related enabling circuit as previously described. In order to achieve control of enabling circuits in a manner which is consistent for all distances up to some maximum, the negative voltage applied to the return circuit conductor should have constant current characteristics to compensate for wide variations in total circuit resistance. Finally, such a circuit should also have the ability to withstand, without damage, at its output terminal, the application of external electrical signals produced by transient random electrical events.

Figure 11:
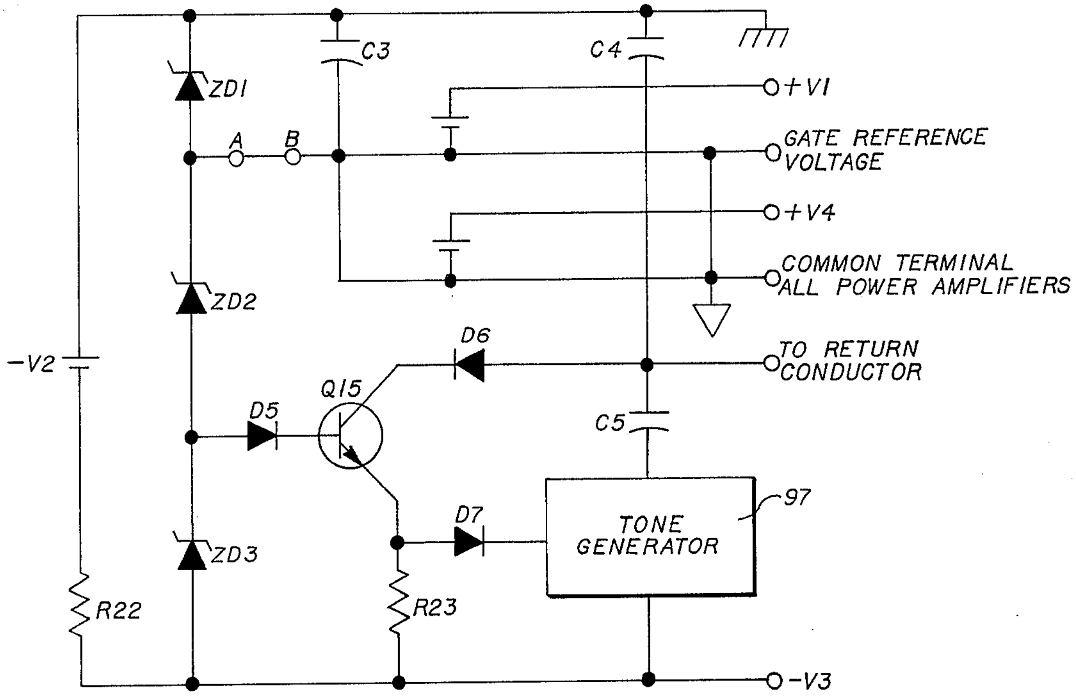
FIG. 11 is a schematic diagram of a return circuit suitable for use by the invention.

A return path circuit which meets the requirements specified in the foregoing paragraph is illustrated in FIG. 11 and comprises: an unregulated but highly filtered DC power source with negative polarity with respect to physical ground designated —V2; three zener diodes designated ZD1, ZD2, and ZD3; three diodes designated D5, D6, and D7; an NPN transistor designated Q15; two resistors designated R22 and R23; and, three capacitors designated C3, C4, and C5. In addition, the return path circuit illustrated in FIG. 11 includes a tone generator 97.

The positive terminal of —V2 is connected to the cathode of ZD1; the anode of ZD1 is connected to the cathode of ZD2; the anode of ZD2 is connected to the cathode of ZD3; and, the anode of ZD3 is connected through R22 to the negative terminal of —V2. The positive terminal of —V2 is also connected to: one side of C3; one side of C4; and, physical ground. The junction between ZD1 and ZD2 is connected to the other side of C3 through two points designated A and B whose purpose will be hereinafter described. The other side of C3 is also connected to an output terminal designated "gate reference voltage." This terminal is connected through individual resistors R19 to the gates of the enabling circuit SCRs. The other side of C3 is also connected to an output terminal designated "common terminal-all power amplifiers." This terminal is connected to the common terminal of the power amplifiers of the first, second, and final word group amplifiers.

The junction between ZD2 and ZD3 is connected to the anode of D5 and the cathode of D5 is connected to the base of Q15. The emitter of Q15 is connected to the anode of D7 and through R23 to the junction between R22 and ZD3. The cathode of D7 is connected to the input of the tone generator 97. The tone generator 97 is also connected through C5 to the other terminal of C4. The junction between C4 and C5 is connected to the anode of D6. The cathode of D6 is connected to the collector of Q15. The tone generator is further connected to the junction between R22 and ZD3. Finally, the junction between C4 and C5 is also connected to an output terminal designated "to return conductor." This terminal is, obviously connected to the conductor being used to provide a return path.

As indicated above, —V2 is an unregulated, but highly filtered, DC power source of negative polarity with respect to ground. —V2 provides a minimum voltage more negative than a predetermined level, such as —85 volts for example, under conditions of low primary power voltage. ZD1, ZD2, and ZD3 permit regulated voltages to be derived from −V2. The voltage across ZD1 is employed as the negative gate reference voltage for the enabling circuit SCRs and also as the common voltage for the power amplifiers, and is typically in the range of from −24 to −25 volts. The voltage across ZD1 and ZD2 is, for example, approximately −75 volts and the voltage across ZD1, ZD2, and ZD3 is, as indicated above, approximately −85 volts. R22 absorbs the voltage difference between the voltage drop across the zener diodes and the power supply voltage −V2.

The voltage drop across ZD3, approximately 10 volts, serves as a reference voltage for a constant-current generator comprising D5, Q15, R23, and D6. D5 is a current-limiting device that limits the value of the base current applied to Q15 under the condition of zero collector current flow. This condition exists when the return circuit is open and no conductor is being identified.

Q15 serves to limit the flow of return circuit direct current to that value which causes the voltage drop across R23, plus, the base-emitter voltage drop of Q15 itself, to equal the reference voltage produced across ZD3, less the voltage drop across D5. The value of R23 is such that the return circuit direct current is limited to a desired level, usually in the order of 20 to 25 milliamperes. Q15 is a type of transistor having collector breakdown voltage ratings of several hundred volts positive with respect to its base or emitter. D6 is a high breakdown voltage device (typically rated at 600 volts) and is included to protect Q15 from transient negative voltages which might occur on the return conductor.

D7 serves to disable the tone generator 97 whenever current limiting transistor Q15 passes return circuit direct current; that is, whenever a conductor or conductor pair is being identified. Except for the requirement that the voltage drop across R23 fall to near zero in the absence of return circuit current, D5 could be replaced by a direct connection.

C3 provides a low impedance path for audio frequency signals between the common terminal of all of the power amplifiers and physical ground. C4, similarly, provides a low impedance path for audio signals between the return conductor and physical ground. Together, C3 and C4 satisfy the requirement that a low electrical impedance to the flow of audio frequency electrical waveforms (words) between the return conductor and the common terminal of the power amplifiers be provided by the return path circuit.

The tone generator 97 is included so that the user of the invention can easily identify the return circuit conductor. The tone generator generates an audible signal which is applied through C5 to the return conductor at all times except for the period of time during which a conductor or conductor pair is being identified. During this period of time the tone generator is disabled, as previously discussed. A suitable tone generator circuit suitable for use by the invention is illustrated in FIG. 12.

Figure 12:
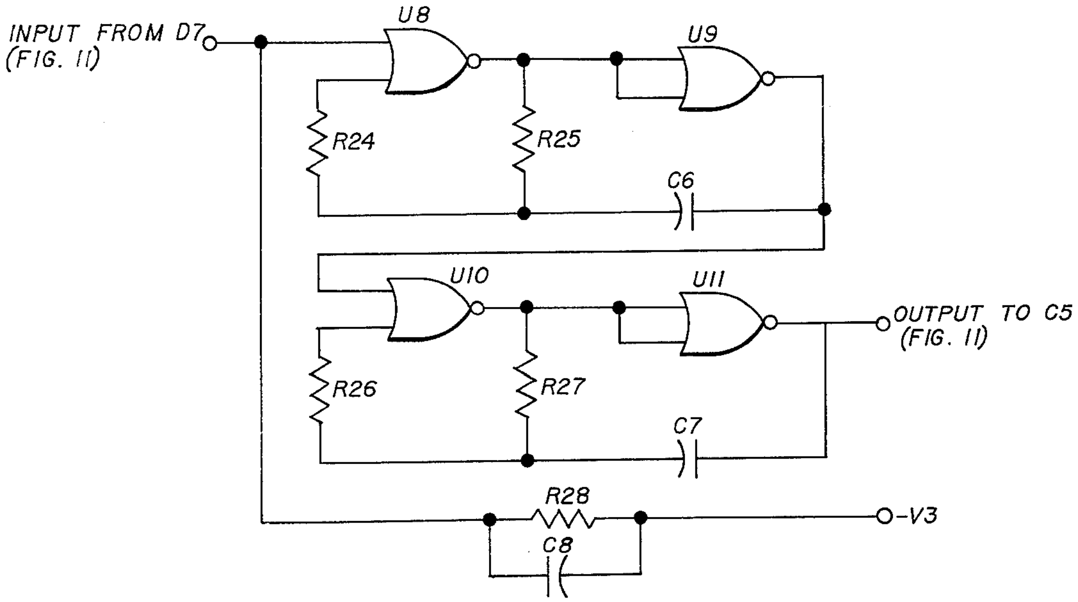
FIG. 12 is a schematic diagram of a tone generator suitable for use in the return circuit illustrated in FIG. 11.

The tone generator illustrated in FIG. 12 comprises four NOR gates designated U8, U9, U10, and U11; five resistors designated R24–R28; and, three capacitors designated C6, C7, and C8. Power for the NOR gates is obtained from the voltage drop across ZD3 (FIG. 11). The cathode of D7 is connected to one input of U8. The output of U8 is connected to both inputs of U9 and through R25 in series with R24 to the other input of U8. The junction between R24 and R25 is connected through C6 to the output of U9. The output of U9 is also connected to one input of U10. The output of U10 is connected to both inputs of U11 and through R27 in series with R26 to the other input of U10. The junction between R26 and R27 is connected through C7 to the output of U11. The output of U11 is also connected to C5. Further, the cathode terminal of D7 is connected through R28 in parallel with C8 to −V3 (FIG. 11).

U10 and U11 in combination with R26, R27, and C7 form an oscillator circuit which oscillates at a predetermined frequency determined by the value of R27 and C7, preferably of the order of 500 Hertz. R26 establishes waveform time symmetry for this oscillator. The 500 Hertz oscillations are, in turn, interrupted at a periodic rate by a second oscillator circuit. More specifically, U8 and U9 in combination with R24, R25, and C6 form a second oscillator that oscillates at a given frequency in the range of from 1 to 10 Hertz. The exact frequency of oscillation of this oscillator is determined by the values of R25 and C6, preferably, they are chosen so that it is 5 Hertz. R24 establishes wave form time symmetry for this oscillator.

The interrupter oscillator is enabled by a control signal applied through D7 and, when idle, disables the 500 Hertz oscillator. As previously indicated, C5 couples the output of the 500 Hertz oscillator to the return conductor.

C8 is provided to delay turn-on of the interrupted 500 Hertz oscillator signal for several minutes after cessation of return circuit direct current, and may be eliminated if this feature is not desired. Preferably, all of the logic elements employed are of the complimentary metal oxide semiconductor (CMOS) type, even though other types can be employed, if desired.

Voltage Variation Compensation Circuits

Figure 13:
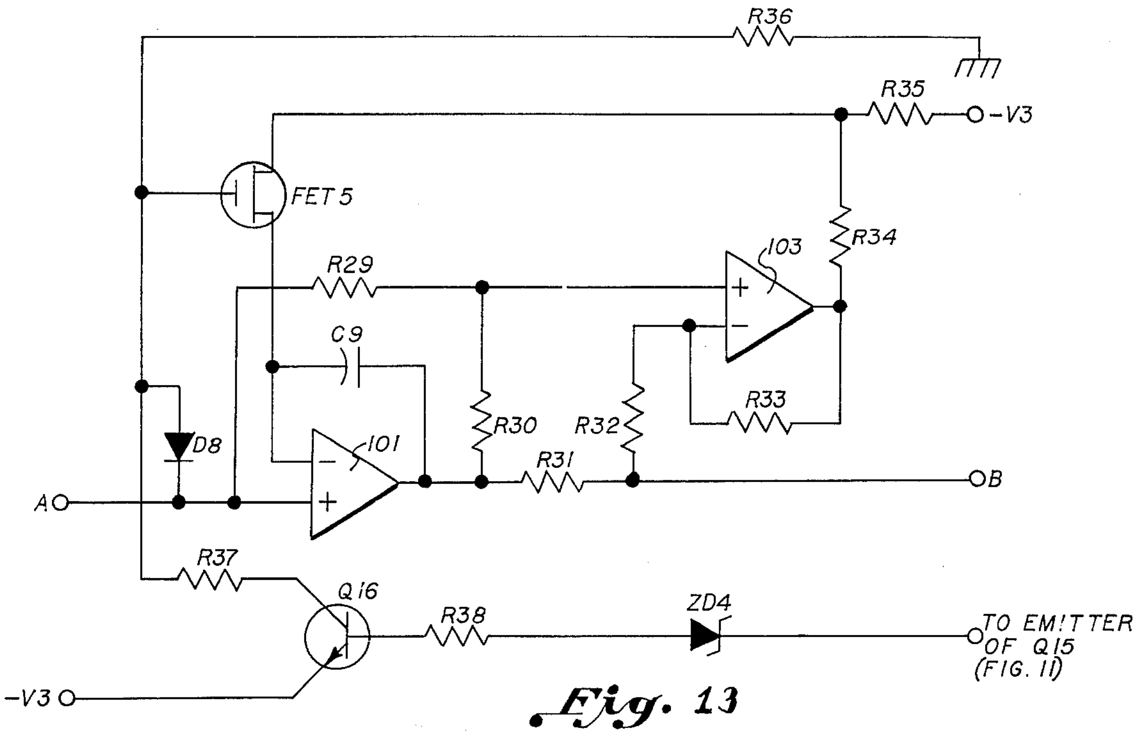
FIG. 13 is a schematic diagram of a compensation circuit suitable for use by the invention for automatically compensating for voltage variations in a central office power supply.

It will be appreciated by those skilled in the art and others that, if the voltage at the junction between ZD1 and ZD2 (FIG. 11) is not appropriately set with respect to the voltage at the input terminals of the output coupling circuits (FIG. 10), proper operation of the enabling circuits may be impaired. For example, if the invention is being used to identify the conductors or conductor pairs of a telephone cable and if the voltage level of the telephone central office supply power system (battery) should vary by several volts, minor adjustments to the gate reference voltage would have to be made in order for the enabling circuits to work properly. Hence, it is desirable to provide a means for automatically compensating for variations of the voltage level of such a power source. The invention provides such a means. Specifically, FIG. 13 illustrates a compensator circuit which automatically compensates for such variations. The compensator circuit illustrated in FIG. 13 is connected between points A and B illustrated in FIG. 11 (the direct connection shown being removed) and adjusts the SCR reference voltage and the power amplifier common voltage to a value which, when no return circuit direct current is flowing, just prevents significant current flow between points A and B. Such current flow, if it did exist, would be applied to all conductors or conductor pairs to be identified and would be made up of clipped positive speech wave form signal peaks. Thus, such a current flow would degrade the signal-to-noise ratio of identifier word sequences, particularly when the cable extends over long distances.

The compensator circuit illustrated in FIG. 13 comprises: a field effect transistor designated FET5; and NPN transistor designated Q16; a diode designated D8; a zener diode designated ZD4; ten resistors designated R29–R38; a capacitor designated C9; and two differential amplifiers 101 and 103. Point A is connected to the cathode of D8 and the positive (+) input of the first differential amplifier 101. Point A is also connected through R29 in series with R30 to the output of the first differential amplifier 101. The junction between R29 and R30 is connected to the positive (+) input of the second differential amplifier 103. The negative (−) input of the first differential amplifier 101 is connected through C9 to the output of the first differential amplifier. The negative (−) input of the first differential amplifier is also connected to the drain terminal of FET5. The gate terminal of FET5 is connected to the anode of D8 and through R36 to physical ground. The source terminal of FET5 is connected through R35 to a suitably regulated negative voltage source −V3 (FIG. 11) and through R34 to the output of the second differential 103. R33 is connected between the negative (−) input of the second differential amplifier and the output of the second differential amplifier.

The output of the first differential amplifier 101 is also connected through R31 in series with R32 to the negative input of the second differential amplifier 103. The junction between R31 and R32 is connected to point B. The anode of D8 is also connected through R37 to the collector of Q16. The emitter of Q16 is connected to the negative supply side of R23 (−V3, FIG. 11). The gate of Q16 is connected through R36 to the anode of ZD4. The cathode of ZD4 is connected to the collector of Q15 (FIG. 11).

The compensator circuit illustrated in FIG. 13 functions as a current sampling operational integrator to maintain the current flowing between points A and B at a known (very small) value. The input to the integrator is gated by direct current flow on the return circuit conductor so that adjustments to the reference voltage value (Point B) are only made when the overall apparatus of the invention is idle. At other times, the reference voltage value is held constant so that errors will not be introduced by the normal current flow associated with word sequences.

Figure 14:
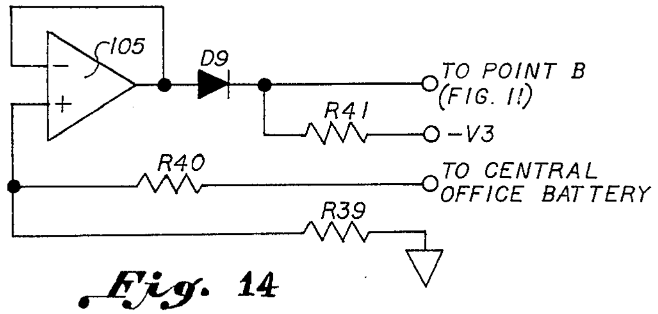
FIG. 14 is a schematic diagram of an alternate compensation circuit suitable for automatically compensating for voltage variations in a central office power supply.

FIG. 14 illustrates an alternate apparatus for automatically compensating for different (or changing) central office battery voltages or the like. The circuit illstrated in FIG. 14 comprises three resistors designated R39, R40, and R41; a diode designated D9; and, a single differential amplifier 105. R39 and R40 are connected in series between physical ground and the central office battery. Preferably, the value of R39 is equal to the value of R40. In any event, the junction between R39 and R40 is connected to the positive (+) input of the differential amplifier 105. The negative (−) input of the differential amplifier 105 is connected to its output. The output of the differential amplifier 105 is also connected to the anode of D9, and cathode of D9 is connected through R41 to the central office battery. The junction between the cathode of D9 and R4 is connected to point B (FIG. 11). When this circuit is used the direct connection between points A and B is removed.

The symmetrical voltage divider made up of R39 and R40 provides an output voltage equal to one half of the central office battery voltage. The remaining portion of the circuit acts as a unity gain voltage follower which "unloads" the voltage divider and permits current to flow without a shift in voltage due to the impedance of the divider. D9 provides an offset that prevents inadvertent triggering of the enabling circuits.

Power Supply and Alternate Return Path Circuit

Figure 15:
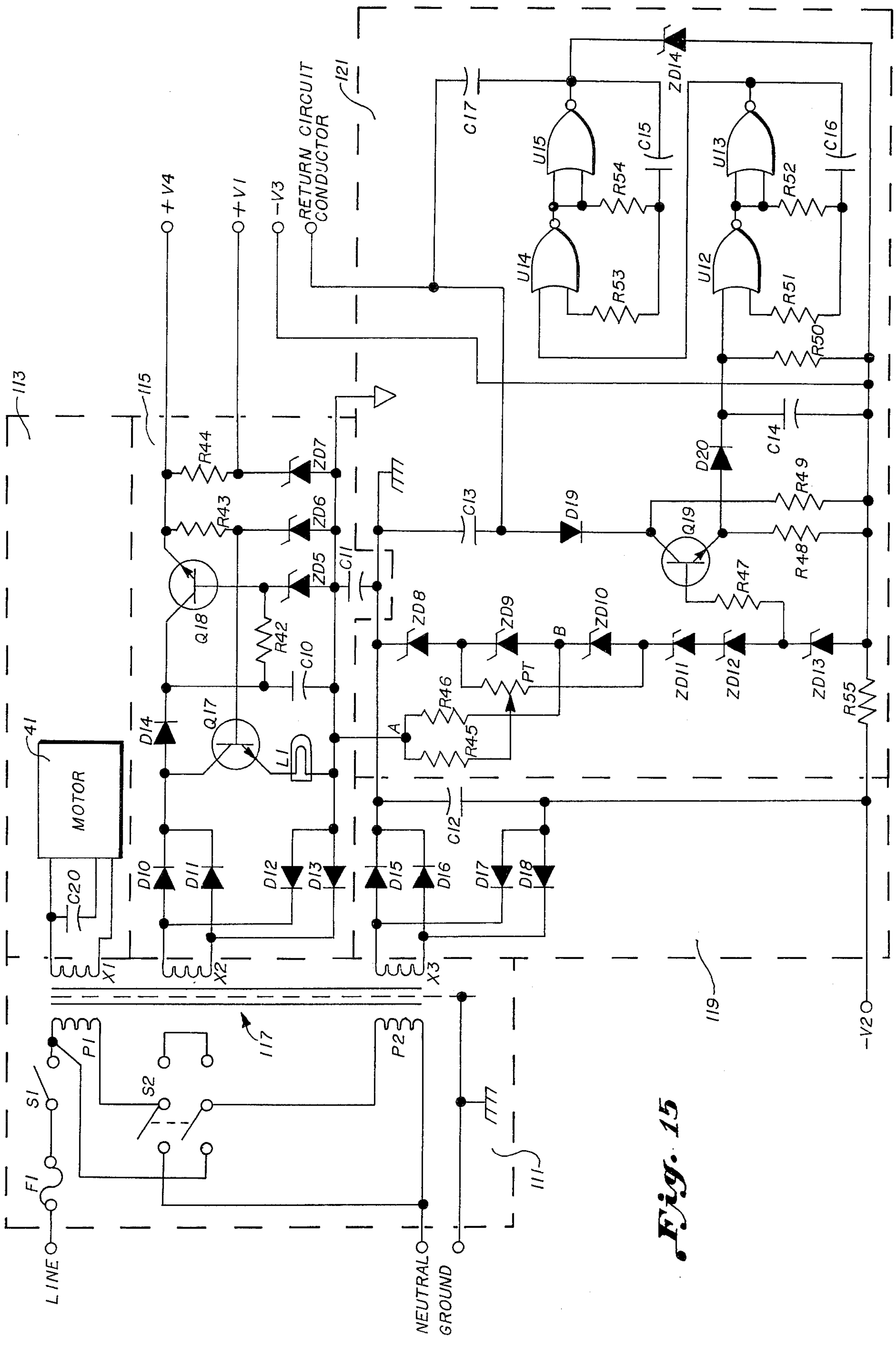
FIG. 15 is a schematic diagram of a power supply suitable for use by the invention and includes an alternate embodiment of return circuit as a portion thereof; and, FIG. 16 is a schematic diagram of a passive bridging network suitable for use by the invention to prevent any temporary unbalance of a conductor pair to which the audio transducer may be connected.

FIG. 15 illustrates a power supply circuit suitable for use by the embodiment of the invention heretofore described, and an alternative embodiment of a return circuit. The power supply portion of FIG. 15 includes a transformer power supply 111; a motor power supply 113; and, a main power supply 115. The transformer power supply supplies power to the motor power supply and to the main power supply and comprises: a transformer 111 having two primary windings designated P1 and P2, and three secondary windings designated X1, X2, and X3; a fuse designated F1; a single-pole, single-throw on-off switch designated S1; and a double-pole, double-throw switch designated S2. The transformer power supply may be connected to either a 230 volt 60 cycle power source or 115 volt 60 cycle power source. In either event three inputs designated "line," "neutral," and "ground" for purposes of description are applied to the transformer power supply. The line input is connected through F1 to the switch terminal of S1. The remote terminal of S1 is connected to the lower terminal of the left set of remote terminals of S2, as S2 is illustrated in FIG. 15, and through P1 to the upper switch terminal of S2. The lower switch terminal of S2 is connected through P2 to the neutral input. The neutral input is also connected to the upper left remote terminal of S2. The right remote terminals of S2 are connected together and the ground input is connected to the shield of the transformer 117.

S2 acts to control whether P1 and P2 are connected in series or in parallel. They are connected in series when the voltage between the line and neutral inputs is 230 volts, and they are connected in parallel when the voltage between the line and neutral inputs is 115 volts. In this manner, either 115 or 230 volt power sources can be used to power the invention; moreover, if suitable modifications are made to the invention, other types of power supplies may also be used.

X1 is connected to the motor 41 which rotates the disk 45. A capacitor designated C20 is connected across the motor for starting purposes, as is also well-known in the art. Preferably, the motor rotates at a slow speed, such as one revolution per second. A suitable motor for use by the invention is a Hurst DA 60 motor. Alternatively, any other suitable electrical motor can be used by the invention. Either the motor can be designed to rotate its shaft at the desired speed or its shaft can rotate at an alternate speed and gears or other means used to obtain the desired speed of rotation.

The main power supply 115 comprises five diodes designated D10–D14; two NPN transistors designated Q17 and Q18; three zener diodes designated ZD5, ZD6, and ZD7; two capacitors designated C10 and C11; three resistors designated R42, R43, and R44; and, a lamp designated L1.

D10, D11, D12 and D13 form a full wave rectifying bridge connected to X2. More specifically, one side of X2 is connected to the anode of D10 and to the cathode of D12. The other side of X2 is connected to the anode of D11 and to the cathode of D13. The cathodes of D10 and D11 are connected together, as are the anodes of D12 and D13.

The cathodes of D10 and D11 are connected to the collector of Q17 and to the anode of D14. The emitter of Q17 is connected through L1 to the anodes of D12 and D13. The cathode of D14 is connected through C10 to the anodes of D12 and D13, and the collector of Q18. The base of Q18 is connected through R42 to the junction between C10 and D14, and to the cathode of ZD5. The anode of ZD5 is connected to the anodes of D12 and D13. The emitter of Q18 is connected through R43 to the cathode of ZD6, and through R44 to the cathode of ZD7 as well as to an output terminal designated "amplifier" which in turn is connected to supply power to the power amplifiers previously described (i.e., it is connected to +V4 — FIG. 7). The junction between R43 and ZD6 is connected to the base of Q17. The anodes of ZD6 and ZD7 are both connected to the anodes of D12 and D13 as well as to an output terminal designated "common" which is connected to the common terminals of the power amplifiers (when the return path circuit illustrated in FIG. 15, and hereinafter described, is used). C11 is connected between the anodes of D12 and D13 and chassis ground. Finally, the junction between R44 and ZD7 is connected to an output terminal designated logic which supplies +V1 power to the control logic circuit previously described.

Q17 and Q18 and ZD5, ZD6 and ZD7 provide current and voltage regulation. L1 is the light source that illuminates the sound track disk 45 shown in FIG. 2. D14 is provided to prevent heavy lamp current from appearing as a load to filter capacitor C10 and, thus, prevent excessively discharging that capacitor and producing high ripple voltages.

The return circuit illustrated in FIG. 15 is an alternate to the embodiment of the return circuit illustrated in FIG. 11 and comprises a power supply portion 119 and a return circuit portion 121.

The power supply portion 119 comprises four diodes designated D15, D16, D17, and D18 connected in a full wave rectifier bridge arrangement and a filter capacitor designated C12. More specifically, the anode of D15 and the cathode of D17 are connected to one side of X3, and the anode of D16 and the cathode of D18 are connected to the other side of X3. The cathodes of D15 and D16 are connected together as are the anodes of D17 and D18. C12 is connected across the cathodes of D15 and D16, and the anodes of D17 and D18, to filter the output from the diode bridge.

The return circuit portion 121 illustrated in FIG. 15 comprises: seven zener diodes designated ZD8–ZD14; an NPN transistor designated Q19; two diodes designated D19 and D20; five capacitors designated C13 through C17; eleven resistors designated R45 through R55; a potentiometer designated PT; and, four NOR gates designated U12, U13, U14, and U15.

ZD8 through ZD13 are connected in series, anode-to-cathode, with R55 across C12 with the cathode of ZD8 being connected to the side of C12 connected to the cathodes of D15 and D16, and the anode of ZD13 being connected through R55 to the side of C12 connected to the anodes of D18 and D17. PT is connected across ZD9 and ZD10. The slider terminal of PT is connected through R45 to the anodes of D12 and D13 of the main power supply 115. The junction between ZD9 and ZD10 is connected through R46 to the anodes of D12 and D13.

The cathode of ZD8 is also connected to chassis ground and through C13 to the anode of D19. The cathode of D19 is connected through R49 to the anode of ZD13 and to the collector of Q19. The base of Q19 is connected through R47 to the junction between ZD12 and ZD13. The emitter of Q19 is connected through R48 to the anode of ZD13, and to the anode of D20. The cathode of D20 is connected through C14 connected in parallel with R50 to the anode of ZD13. The cathode of D20 is also connected to one input of U12. The output of U12 is connected to both inputs of U13. The output of U13 is connected to one input of U14 and through C16 connected in series with R52 to the inputs of U13. The junction between R52 and C16 is connected through R51 to the other input of U12. The output of U14 is connected to both inputs of U15. The output of U15 is connected through C17 to the return circuit conductor and through C15 connected in series with R54 to both inputs of U15. The junction between C15 and R54 is connected through R53 to the other input of U14. ZD14 has its cathode connected to the output of U15 and its anode connected to the anode of ZD13. In addition, the anode of D19 is connected to the previously described return circuit conductor.

It will be appreciated from viewing FIG. 15 and the foregoing description that U12–U15 form an oscillator system similar to the oscillator system illustrated in FIG. 12. This oscillator system provides an audio signal used to identify the return conductor. In addition, Q19 is utilized to control the interruption of the oscillator system when a particular conductor or conductor pair is being identified in the manner previously described. R45 and R46 in combination with PT and ZD9 and ZD10 form a trim potentiometer adjustment circuit which can be "factory set" or readjusted at the location of use. This circuit is the main point of difference between the return circuit illustrated in FIG. 15 and the return circuit illustrated in FIG. 11 and, in essence, substitutes for the compensation circuits illustrated in FIGS. 13 and 14; however, it has some limitations. Specifically, this trim potentiometer adjustment circuit is only suitable for use within telephone system or the like where the central office battery voltage variation does not exceed about 0.5 volts. The range of adjustment of the trim potentiometer adjustment circuit is such that the apparatus of the invention can be operated with nominal battery voltage in a predetermined range, such as 47-to-50 volts, for example. It includes sufficient over-range capability to accommodate a plus or minus 5 percent variation in the associated zener diode values.

Summary of Method of Use

It will be appreciated from the foregoing description that the invention comprises a method of and an apparatus for identifying individual conductors or conductor pairs in a multiconductor cable. Generally, the basic apparatus of the invention is connected to one end of the conductors or conductor pairs of the cable whose conductors are to be identified, usually at a central station. After connection, the user of the apparatus or practicer of the method goes to the other end of the cable, which is usually remote from the central station, and listens for the words or word sequences applied to the conductors. The words or word sequences rapidly and uniquely identify each particular conductor or conductor pair. In order to better understand the operation of the device, the normal method of use of the invention will be hereinafter described in detail.

In those cases were a spare cable conductor is available for use as a return conductor, the apparatus of the invention is connected to the appropriate cable conductors or conductor pairs using a main-frame tap-shoe connector or other suitable means. The spare cable conductor, not one of those to be identified, but known to appear at the remote location, is connected to the apparatus of the invention via a return circuit terminal.

Next, the apparatus of the invention is grounded by a suitable ground means, if necessary. Thereafter, the apparatus of the invention is turned on and the user goes to the "remote" location, i.e., the remote end or any intermediate point of the multiconductor cable. The user then temporarily connects one side of his audio transducer (headset, handset, etc.) to the cable sheath, if it is continuous to the apparatus of the invention, or to local ground, or to any other conductor of the cable. He sets the control switch of his audio transducer so that the internal series capacitor thereof is employed, normally by switching to "monitor" or to a "C" position. The user thereafter, using the "free" lead of the audio transducer, locates the return conductor. As previously explained, this conductor is identified when the user detects an interrupted 500 Hertz tone. Alternatively, the return conductor may be located using a high-gain audio amplifier and a non-contacting capacitive probe.

Next, the user connects the free lead of his audio transducer to the return conductor and momentarily places his audio transducer in its normal mode which eliminates the series capacitor. This action removes the return circuit identification tone by allowing return circuit DC current to flow. The user next removes the transducer lead from the sheath, ground, or other cable conductor to which it was temporarily attached and switches his audio transducer to its C or monitor mode of operation. Next the lead of any unknown conductor is connected to the now free transducer lead. If the conductor to which the transducer now connected is not busy, i.e., not carrying external information, the operator places the audio transducer in its normal (talk) mode. The identifying numerals on the particular conductor chosen are then heard, repeated every few seconds. Following identification of this conductor, another conductor is chosen and the last steps of the method repeated. If desired, both conductors of a pair may be separately identified to detect the existance of "split" splices.

In some cases it has been found that a dial tone may be heard when the audio transducer is placed in its normal (talk) mode. If this occurs, the tone is easily eliminated by placing a single dial pulse, generated by the audio transducer, on the conductor, or momentarily interrupting the connection to the audio transducer.

UNBALANCE PREVENTION CIRCUIT

The normal method of use just described is uncomplicated; however, it temporarily unbalances any conductor pair to which the audio transducer is connected. This is not unique to the apparatus of the invention, but occurs in any instance where a monitor device is connected to one side of a conductor pair only. In any event, in some circumstances, an unbalance of this nature cannot be tolerated. If so, an apparatus of the type illustrated in FIG. 16 may be employed. The apparatus illustrated in FIG. 16 permits full use of the invention as previously described; however, as will be better understood from the following description, when this apparatus is used, connection to both conductors of a cable pair is required prior to the audio transducer being placed in its normal (talk) mode.

Figure 16:
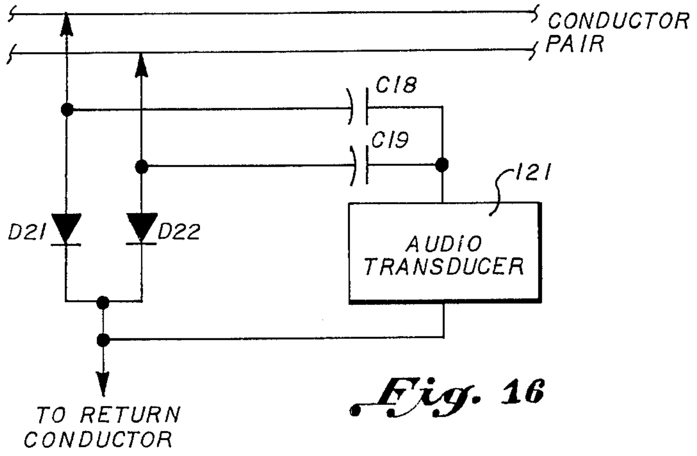

The apparatus illustrated in FIG. 16 comprises: the audio transducer 121; two diodes designated D21 and D22; and, two capacitors designated C18 and C19. One of the conductors of the conductor pair to be identified is connected to the anode of D21 and through C18 the input lead of the audio transducer. The other conductor of the conductor pair is connected to the anode of D22 and through C19 to the same input of the audio transducer. The return terminal of the audio transducer is connected to the cathodes of D21 and D22 and to the return conductor.

D21 and D22 are constant current regular devices, the electrical dual of a zener diode, and serve to divide current flow equally between both conductors of the conductor pair, regardless of the individual conductor voltages. For this reason, no change in the idle/busy status occurs in the pair under test. Thus, for example, in a telephone system no net magnetic flux change occurs in differentially-connected central-office control relays. C18 and C19 are provided to conduct the word sequences to the audio transducer. These capacitors are, preferably, closely matched in value. When so matched, normally balanced speech communication signals existing on the conductor pair are not audible to the user of the apparatus of the invention, and the word sequences produce no response in the communication system to which the apparatus is connected. Thus, interference-free use is assured.

Regardless of whether or not a circuit of the type illustrated in FIG. 16 is included, the distance separating the audio transducer from the main apparatus of the invention can be extended merely by connecting a suitable battery, such as a 22.5 or 45 volt dry battery, in series with the return conductor. The battery may be connected in series either at the location of the identifier apparatus of the invention or at the location of the audio transducer. Current flow will not exceed about 25 milliamperes, and will exist only when the output audio transducer is connected to a cable conductor while in the normal (talk) mode. The negative terminal of the battery should be connected toward the audio transducer and the positive terminal should be connected toward the identifier return circuit terminal.

Greatest DC signalling distance in telephone cables results when the output transducer is connected to the "tip" (least negative) side of a telephone conductor pair served by step-by-step, panel, and rotary switching systems. The normal cable length using the apparatus of the invention alone is the length equivalent to approximately 3,700 ohms loop resistance, and increases to approximately 4,800 ohms and 6,000 ohms respectively, with the use of additional 22.5 and 45 volt batteries, as described above.

When following the method steps of the invention described above, with subscriber-line telephone cables served by cross bar switching systems, identification of idle lines is accomplished by connecting the audio transducer to the "ring" (most negative) side of a conductor pair if at all possible.

In some situations, a return conductor may not be available. Such a situation could occur under full cable or difficult operating conditions. If such a situation does exist, the positive terminal of a suitable DC source, such as a 45 volt dry battery, is connected to the cable sheath if continuous to the identifier apparatus, or to ground at the field location. In this situation, the negative terminal of this battery is considered equivalent to the return circuit. Thus, the steps following the identification of the return conductor described above need only be followed to successfully identify the conductors or conductor pairs of the cable. Note, however, that when this procedure is followed, the cable sheath or ground, as the case may be, acting as the return conductor may also contain currents induced from nearby power systems, harmonics and transients. These signals may interfere with hearing the word sequences, particularly when the multiconductor cable is relatively long.

Occasionally, conductor identification is required between two remote locations rather than between a central station and a remote location, such as, for example, beyond a splice. In this case, the previously described method steps are followed, except that a suitable remote power source is required. Other than this minor change, the method steps previously described are followed.

Although the invention has been described such that integers spoken in the English language are applied to the conductors in word sequence form, other languages and other types of identification words can be utilized, as desired. Hence, the invention has widespread flexibility.

In addition, the basic apparatus of the invention can be expanded so that it can be used to simultaneously identify the conductors or conductor pairs of multiple multiconductor cables. Expander units are created by connecting, usually through a suitable external connector, additional word combination networks, output enabling networks, output coupling networks and return circuits, identical to those in the basic unit, to the outputs of the power amplifiers. Such expander units may be located adjacent to the basic unit or may be connected to it by means of suitable multiconductor cables, to, thereby, allow the expander units to be placed at other convenient locations, as desired. In each case, the expander units operate in a manner identical to the operation of the basic unit to which they are connected. The net result of the use of expander units is that the conductors or conductor pairs of a plurality of multiconductor cables can be simultaneously identified by different personnel each located at the remote end of one of the multiconductor cables.

While a preferred embodiment of the invention has been illustrated and described, it will be appreciated by those skilled in the art and others that various modifications can be made therein, without departing from the spirit and scope of the invention. For example, the embodiment of the invention illustrated and described is limited in general to the production of integers between 0 and 100. However, by adding additional cardinal suffixes, the invention can be expanded. Moreover, if desired, the size of the invention can be reduced to the point where only words and not word sequences are generated and applied to the conductors. Such would be the case if only a few conductors or conductor pairs were to be identified. In addition, while an optical disk has been illustrated and described as the recording medium, other recording mediums can also be used by the invention. For example, endless track magnetic tapes or magnetic drums as well as magnetic disks can be utilized in combination with suitable "read out" means. Moreover, other types of optical systems such as optical tapes or drums can be utilized. Also, semiconductor read-only memory circuits, each containing a plurality of digitally encoded samples of the electrical wave form representing a different word of the identifier vocabulary and each operating in conjunction with a digital-to-analog converter circuit, a sample/hold circuit, and an audio-frequency low-pass filter circuit, can be utilized. Moreover, other read-only type memory circuits can be utilized if desired. Further, a wide variety of different types of specific circuit configurations other than those illustrated and described herein can be utilized by the invention. Hence, the invention can be practiced otherwise than as specifically described herein.

The embodiments of the invention in which an exclusive property or privilege is claimed are defined as follows:

1. A method of identifying at random the conductors or conductor pairs of a multiconductor cable comprising the steps of:

generating a plurality of audio frequency electrical waveforms related to spoken words;

selectively applying said audio frequency electrical waveforms to the conductors of said multiconductor cable;

sequentially detecting the occurrence of the audio frequency electrical waveforms applied to said conductors to thereby identify them by:

enabling the selective application of an audio frequency electrical waveform only to the conductor or conductor pair to be identified at a particular point in the identification sequence; and, detecting only the audio frequency electrical waveform applied to the conductor or conductor pair to be identified at said particular point in the identification sequence.

2. A method of identifying the conductors or conductor pairs of a multiconductor cable as claimed in claim 1, wherein:

said plurality of audio frequency electrical waveforms are applied to one end of said multiconductor cable;

the occurrence of said audio frequency electrical waveforms are sequentially detected at any other point on said cable; and, the selective application of said audio frequency electrical waveforms is enabled by identifying one of said conductors of said multiconductor cable as a return conductor, applying an enabling signal to said return conductor and, at said other point on said cable, coupling said enabling signal to the conductor or conductor pair to be identified to control the selective application of said audio frequency electrical waveform to the conductor or conductor pair to be identified.

3. A method of identifying the conductors or conductor pairs of a multiconductor cable as claimed in claim 2 including the step of selectively combining said generated audio frequency electrical waveforms related to spoken words into word sequences prior to selectively applying said audio frequency electrical waveforms to the conductors of said multiconductor cable.

4. A method of identifying the conductors or conductor pairs of a multiconductor cable as claimed in claim 3, wherein said step of generating audio frequency electrical waveforms comprises the sub-steps of:

recording a plurality of audio frequency electrical waveforms each being related to a spoken word; and simultaneously playing back said plurality of audio frequency electrical waveforms related to spoken words during a predetermined interval.

5. A method of identifying the conductors or conductor pairs of a multiconductor cable as claimed in claim 4, wherein said predetermined interval is approximately one second.

6. A method of identifying the conductors or conductor pairs of a multiconductor cable as claimed in claim 5, wherein said spoken words are related to integers and wherein all of the integers in a predetermined range are encompassed.

7. A method of identifying the conductors or conductor pairs of a multiconductor cable as claimed in claim 6, wherein said word sequences occur at regular intervals and wherein said word sequences are separated by silent periods.

8. A method of identifying the conductors or conductor pairs of a multiconductor cable as claimed in claim 7, including the step of generating a tone burst and applying it to all conductors of said multiconductor cable to identify the start of a word sequence.

9. A method of identifying the conductors or conductor pairs of a multiconductor cable as claimed in claim 8, wherein said return conductor is identified by the steps of applying a tone burst to said return conductor to identify said return conductor and detecting said tone burst applied to said return conductor to thereby identify said return conductor prior to detecting the occurrence of the audio frequency electrical waveforms applied to the other conductors of said multiconductor cable.

10. A method of identifying the conductors or conductor pairs of a multiconductor cable as claimed in claim 1, wherein said step of generating audio frequency electrical waveforms comprises the sub-steps of:

recording a plurality of audio frequency electrical waveforms each being related to a spoken word; and simultaneously playing back said plurality of audio frequency electrical waveforms related to spoken words during a predetermined interval.

11. A method of identifying the conductors or conductor pairs of a multiconductor cable as claimed in claim 10, including the step of selectively combining said generated audio frequency electrical waveforms related to spoken words into word sequences prior to selectively applying said audio frequency electrical waveforms to the conductors of said multiconductor cable.

12. A method of identifying the conductors or conductor pairs of a multiconductor cable as claimed in claim 11, wherein said word sequences occur at regular intervals and wherein said word sequences are separated by silent periods.

13. A method of identifying the conductors or conductor pairs of a multiconductor cable as claimed in claim 12, including the step of generating a tone burst and applying it to the conductor or conductor pair to be identified of said multiconductor cable to identify the start of a word sequence.

14. A method of identifying the conductors or conductor pairs of a multiconductor cable as claimed in claim 1, wherein said return conductor is identified by the steps of applying a tone burst to said return conductor to identify said return conductor and detecting said tone burst applied to said return conductor to thereby identify said return conductor prior to detecting the occurrence of the audio frequency electrical waveform applied to the other conductors of said multiconductor cable.

15. Apparatus for identifying the conductors or conductor pairs of a multiconductor cable comprising:

a speech waveform generator for generating a plurality of audio frequency electrical waveforms related to spoken words;

coupling means for coupling said speech waveform generator to the conductors of said multiconductor cable; and, control means connected to said coupling means for controlling said coupling means so that said plurality of audio frequency electrical waveforms are selectively applied to the conductors of said multiconductor cable, said control means including enabling means connected to said coupling means for allowing only selected ones of said audio frequency electrical waveforms to be applied to selected conductors of said multiconductor cable; and, detection means suitable for selective connection to said conductors of said multiconductor cable for detecting only the audio frequency electrical waveforms applied to the conductor or conductors to which it is connected and creating an enabling signal compatible therewith, said enabling signal being appplied to said enabling means in a manner such that audio frequency electrical waveforms are only applied to conductor or conductors to which said detection means is connected.

16. Apparatus for identifying the conductors or conductor pairs of a multiconductor cable as claimed in claim 15, wherein said plurality of audio frequency electrical waveforms are simultaneously generated.

17. Apparatus for identifying the conductors or conductor pairs of a multiconductor cable as claimed in claim 16, wherein said speech wave form generator includes:

storing means for storing information related to said plurality of audio frequency electrical waveforms; and, reading means for reading the information stored by said storing means and simultaneously generating said plurality of audio frequency electrical waveforms.

18. Apparatus for identifying the conductors or conductor pairs of a multiconductor cable as claimed in claim 17, wherein said storage means comprises a record having a plurality of adjacent tracks; and, said reading means comprises a plurality of read devices located so as to simultaneously read the signals recorded on the tracks of said record.

19. Apparatus for identifying the conductors or conductor pairs of a multiconductor cable as claimed in claim 18, wherein said record is an optical record; and, wherein said read devices comprise light means for generating a plurality of light beams and a plurality of photo transistors, said photo transistors being located adjacent to the tracks of said optical record for simultaneously reading the information recorded on the tracks of said optical record.

20. Apparatus for identifying the conductors or conductor pairs of a multiconductor cable as claimed in claim 19, wherein said coupling means includes a speech waveform switching circuit having its input connected to the output of said speech waveform generator for selectively applying the outputs of said speech waveform generator to a plurality of output channels.

21. Apparatus for identifying the conductors or conductor pairs of a multiconductor cable as claimed in claim 20, wherein said coupling means also includes a word combination network connected to the outputs of said speech waveform switching circuit so as to selectively combine the outputs of said speech waveform switching circuit to provide a plurality of word sequence outputs.

22. Apparatus for identifying the conductors or conductor pairs of a multiconductor cable as claimed in claim 21, wherein said speech waveform generator generates pulses at the beginning and end of said adjacent record tracks and wherein said coupling means also includes a control logic circuit connected to said speech waveform generator to receive said pulses and to said speech waveform switching circuit to control the operation of said speech waveform switching circuit.

23. Apparatus for identifying the conductors or conductor pairs of a multiconductor cable as claimed in claim 22, wherein said control logic circuit includes a tone burst generator for generating a tone burst suitable for application to the conductors of said multiconductor cable at predetermined intervals.

24. Apparatus for identifying the conductors or conductor pairs of a multiconductor cable as claimed in claims 23, wherein said coupling circuit also includes a plurality of groups of power amplifiers connected between the outputs of said speech waveform switching circuits and the inputs of said word combination networks.

25. Apparatus for identifying the conductors or conductor pairs of a multiconductor cable as claimed in claim 24, wherein said enabling means includes an enabling network connected between the output of said word combination network and the conductors of said multiconductor cable for selectively enabling the application of said word sequence outputs of said word combination network to the conductors of said multiconductor cable.

26. Apparatus for identifying the conductors or conductor pairs of a multiconductor cable as claimed in claim 25, including a coupling network connected between the output of said enabling network and the conductors of said multiconductor cable to couple the output of said enabling network to the conductors of said multiconductor cable.

27. Apparatus for identifying the conductors or conductor pairs of a multiconductor cable as claimed in claim 26, including a return circuit connected between a return conductor and the power amplifiers of said coupling means, said return conductor forming one of the conductors of said multiconductor cable.

28. Apparatus for identifying the conductors or conductor pairs of a multiconductor cable as claimed in claim 27, wherein said return circuit includes a tone burst generator adapted to apply a tone to said return conductor to identify said return conductor.

29. Apparatus for identifying the conductors or conductor pairs of a multiconductor cable as claimed in claim 28, wherein said tone burst generator of said return circuit is disabled when one of said conductors is being identified.

30. Apparatus for identifying the conductors or conductor pairs of a multiconductor cable as claimed in claim 15, wherein said coupling means includes a speech waveform switching circuit having its input connected to the output of said speech waveform generator for selectively applying the outputs of said speech waveform generator to a plurality of output channels.

31. Apparatus for identifying the conductors or conductor pairs of a multiconductor cable as claimed in claim 30, wherein said coupling means also includes a word combination network connected to the outputs of said speech waveform switching circuit so as to selectively combine the outputs of said speech waveform switching circuit to provide a plurality of word sequence outputs.

32. Apparatus for identifying the conductors or conductor pairs of a multiconductor cable as claimed in claim 31, wherein said speech waveform generator generates pulses at the beginning and end of said audio frequency electrical waveforms and wherein said coupling means also includes a control logic circuit connected to said speech waveform generator to receive said pulses and to said speech waveform switching circuit to control the operation of said speech waveform switching circuit.

33. Apparatus for identifying the conductors or conductor pairs of a multiconductor cable as claimed in claim 32, wherein said control logic circuit includes a tone burst generator for generating a tone burst suitable for application to the conductors of said multiconductor cable at predetermined intervals.

34. Apparatus for identifying the conductors or conductor pairs of a multiconductor cable as claimed in claim 33, including a return circuit connected between a return conductor and said coupling means, said return conductor forming one of the conductors of said multiconductor cable.

35. Apparatus for identifying the conductors or conductor pairs of a multiconductor cable as claimed in claim 34, wherein said return circuit includes a tone burst generator adapted to apply a tone to said return conductor to identify said return conductor.

36. Apparatus for identifying the conductors or conductor pairs of a multiconductor cable as claimed in claim 35, wherein said tone burst generator of said return circuit is disabled when one of said conductors is being identified.

37. Apparatus for identifying the conductors or conductor pairs of a multiconductor cable as claimed in claim 15, including a return circuit connected between a return circuit conductor and said coupling means, said return circuit conductor being one of said conductors of said multiconductor cable.

38. Apparatus for identifying the conductors or conductor pairs of a multiconductor cable as claimed in claim 37, wherein said return circuit includes a tone burst generator adapted to apply a tone to said return conductor to identify said return conductor.

39. Apparatus for identifying the conductors or conductor pairs of a multiconductor cable as claimed in claim 38, wherein said tone burst generator of said return circuit is disabled when one of said conductors is being identified.

* * * * *